E. B. HESS AND L. C. MYERS.
TYPEWRITING MACHINE.
APPLICATION FILED JAN. 13, 1921.
1,418,440.
Patented June 6, 1922.
20 SHEETS—SHEET 18.
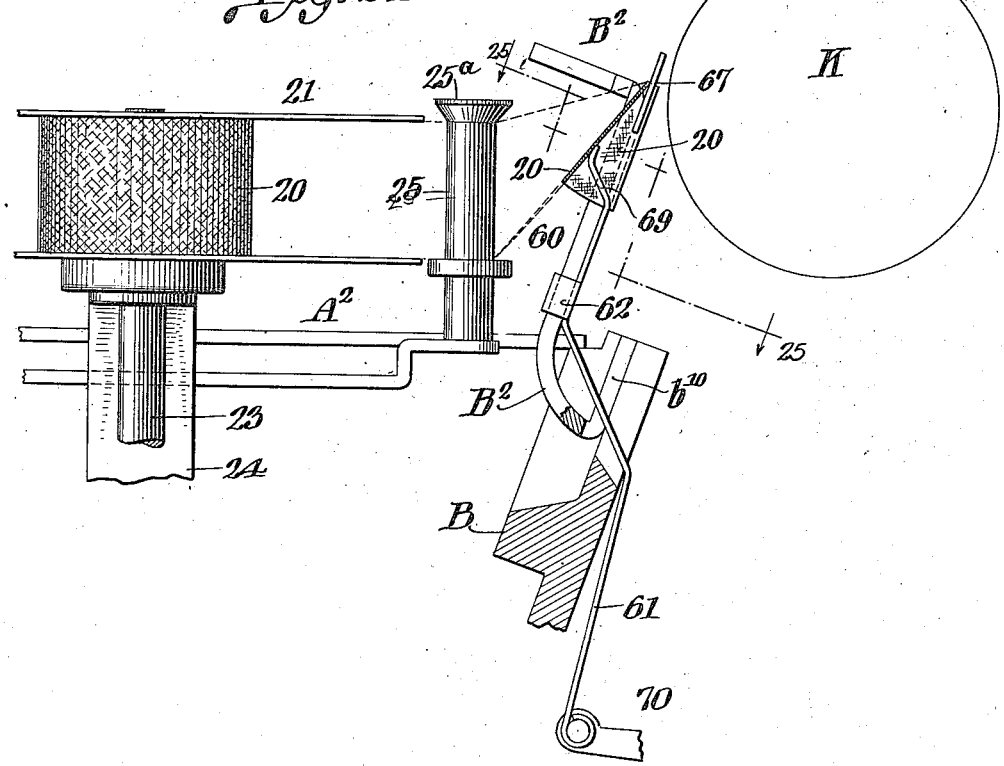
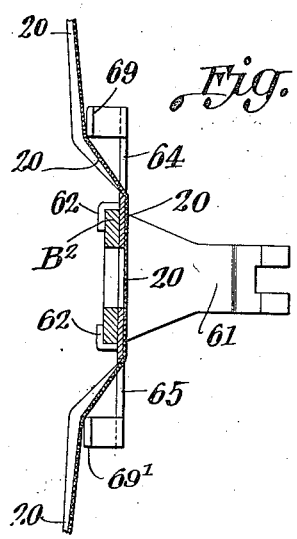
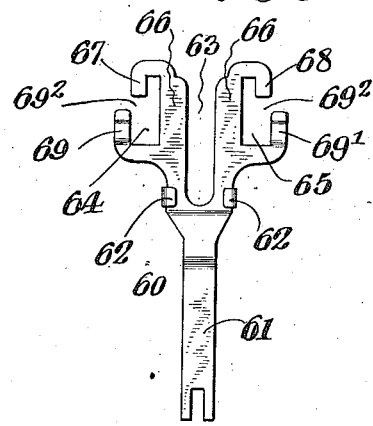
Inventors
Edward B. Hess
Lewis C. Myers
By their Attorneys

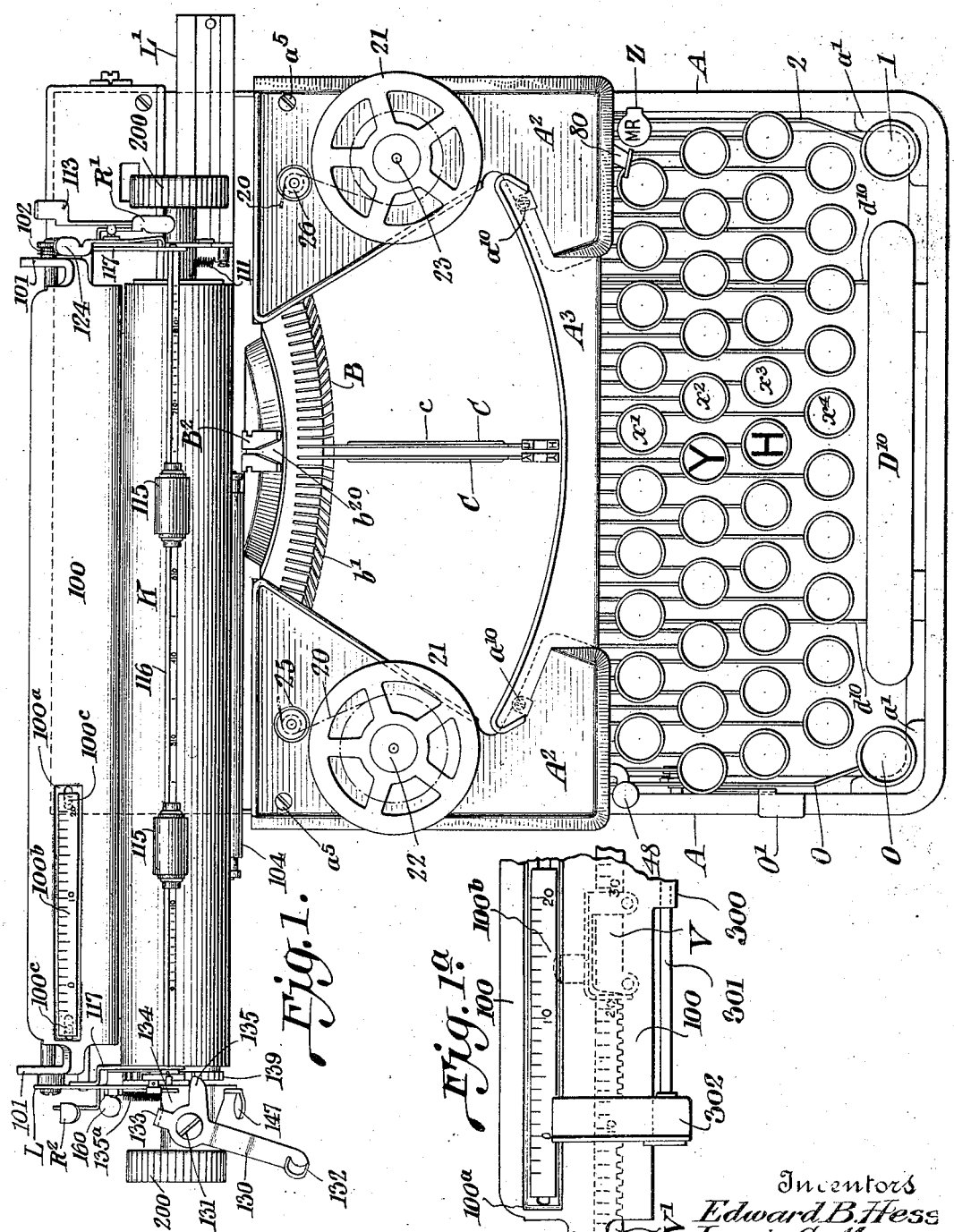

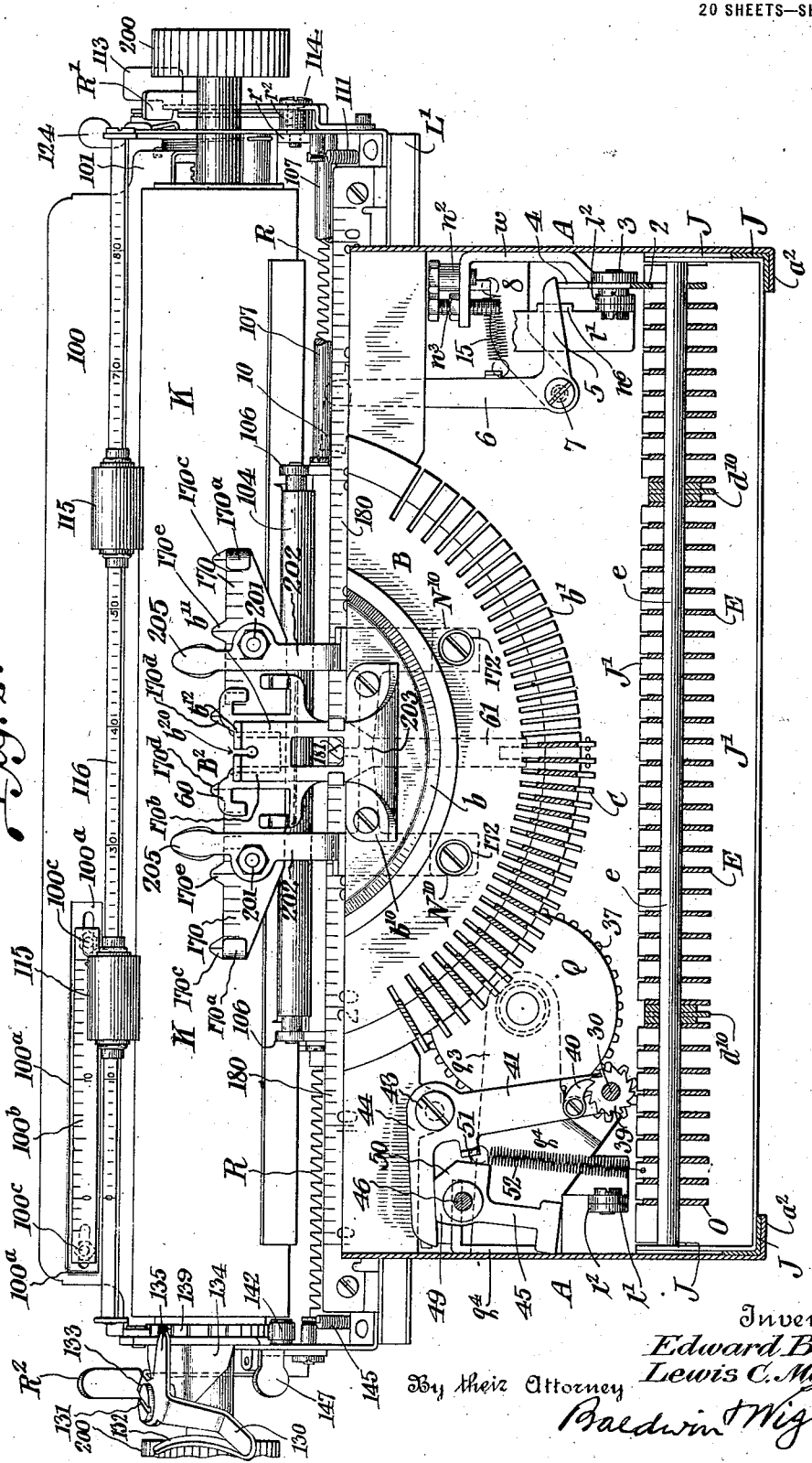

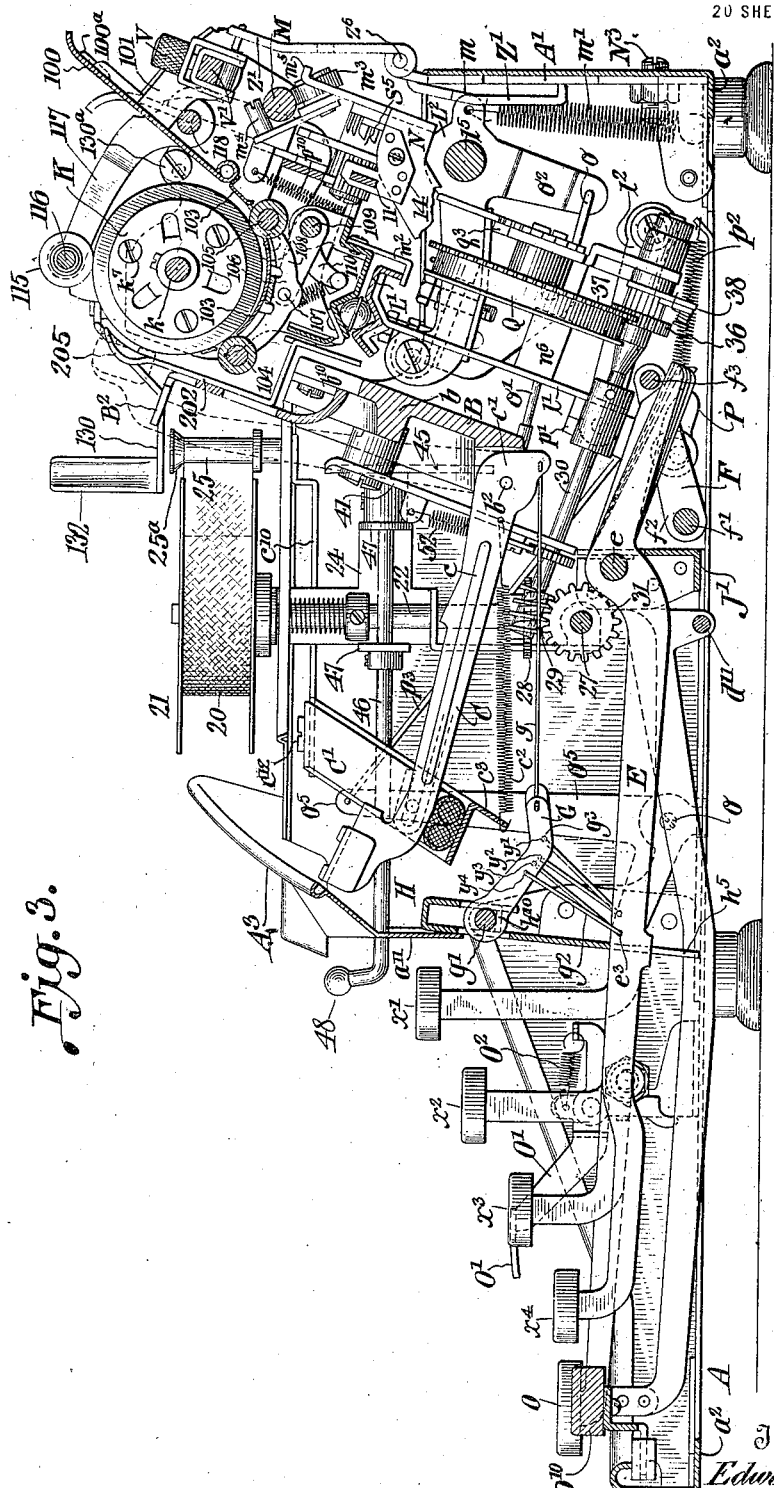

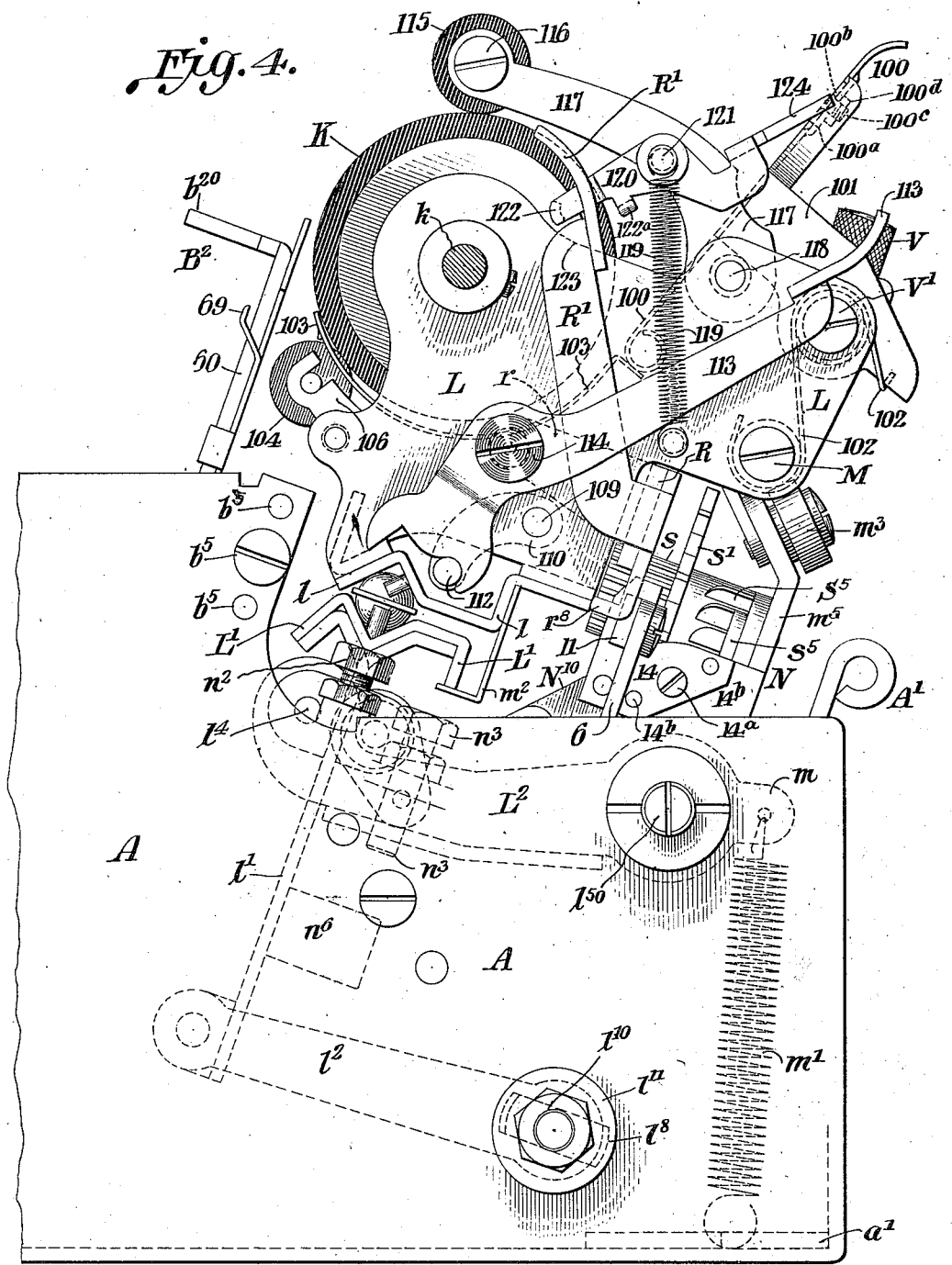

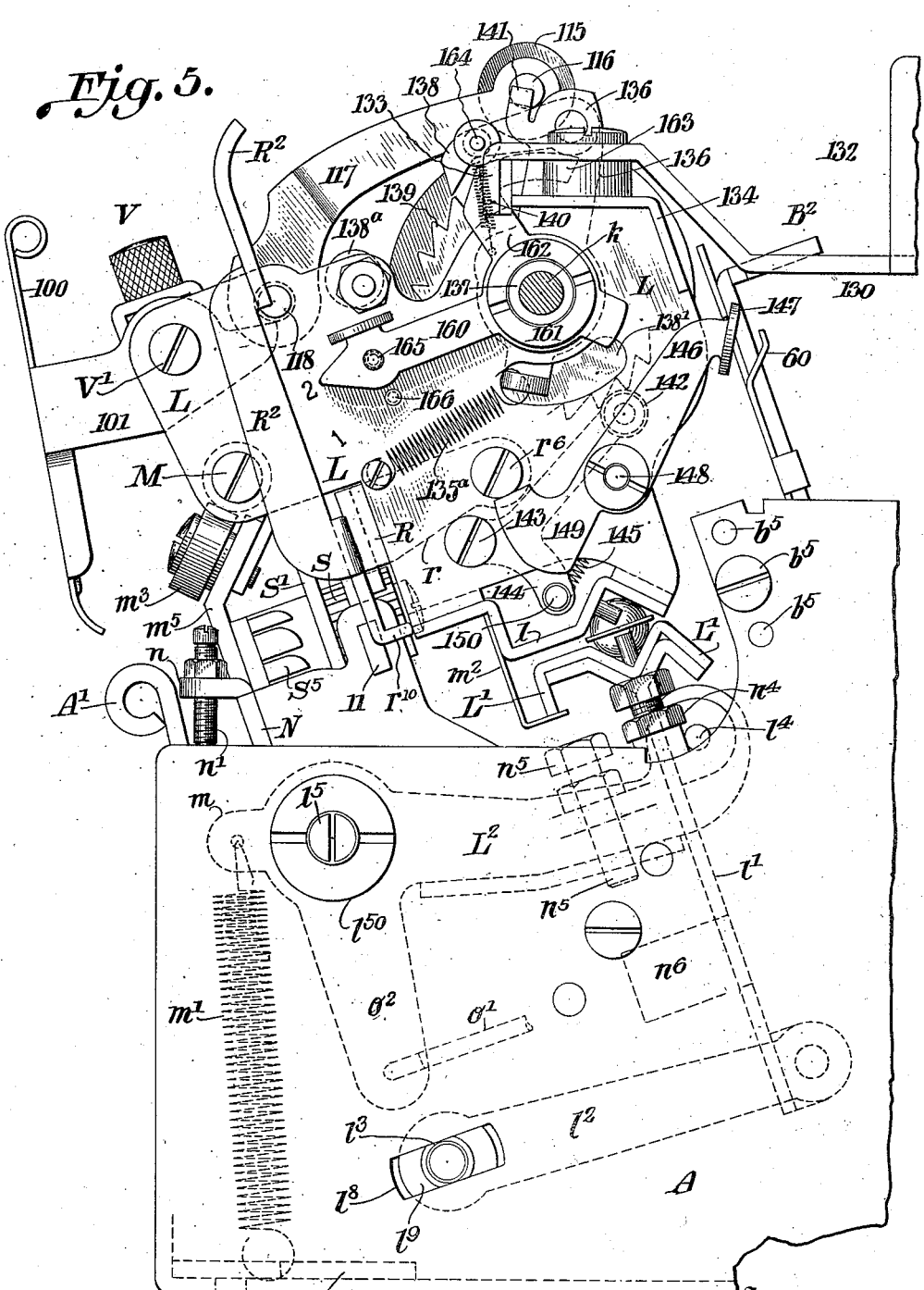

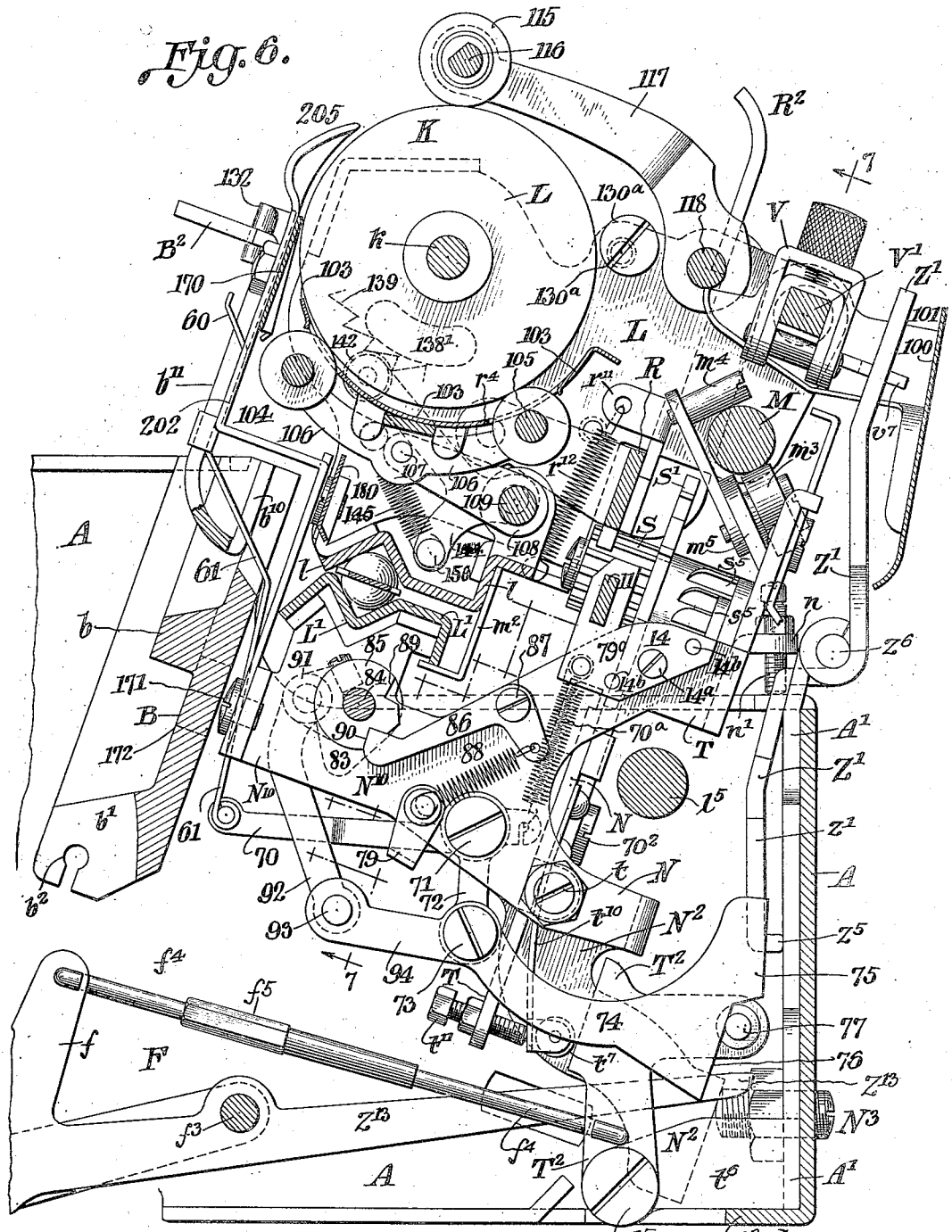

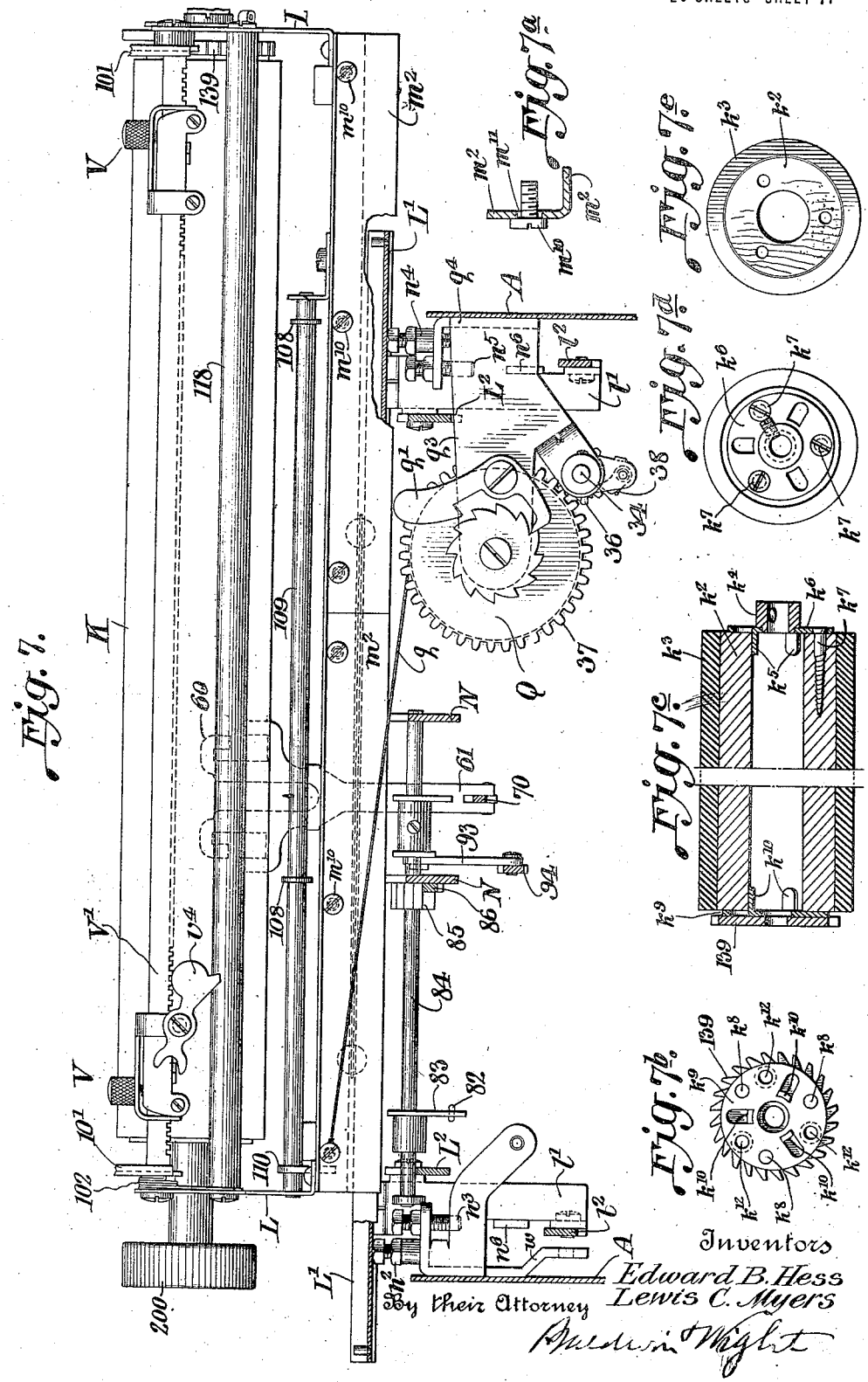

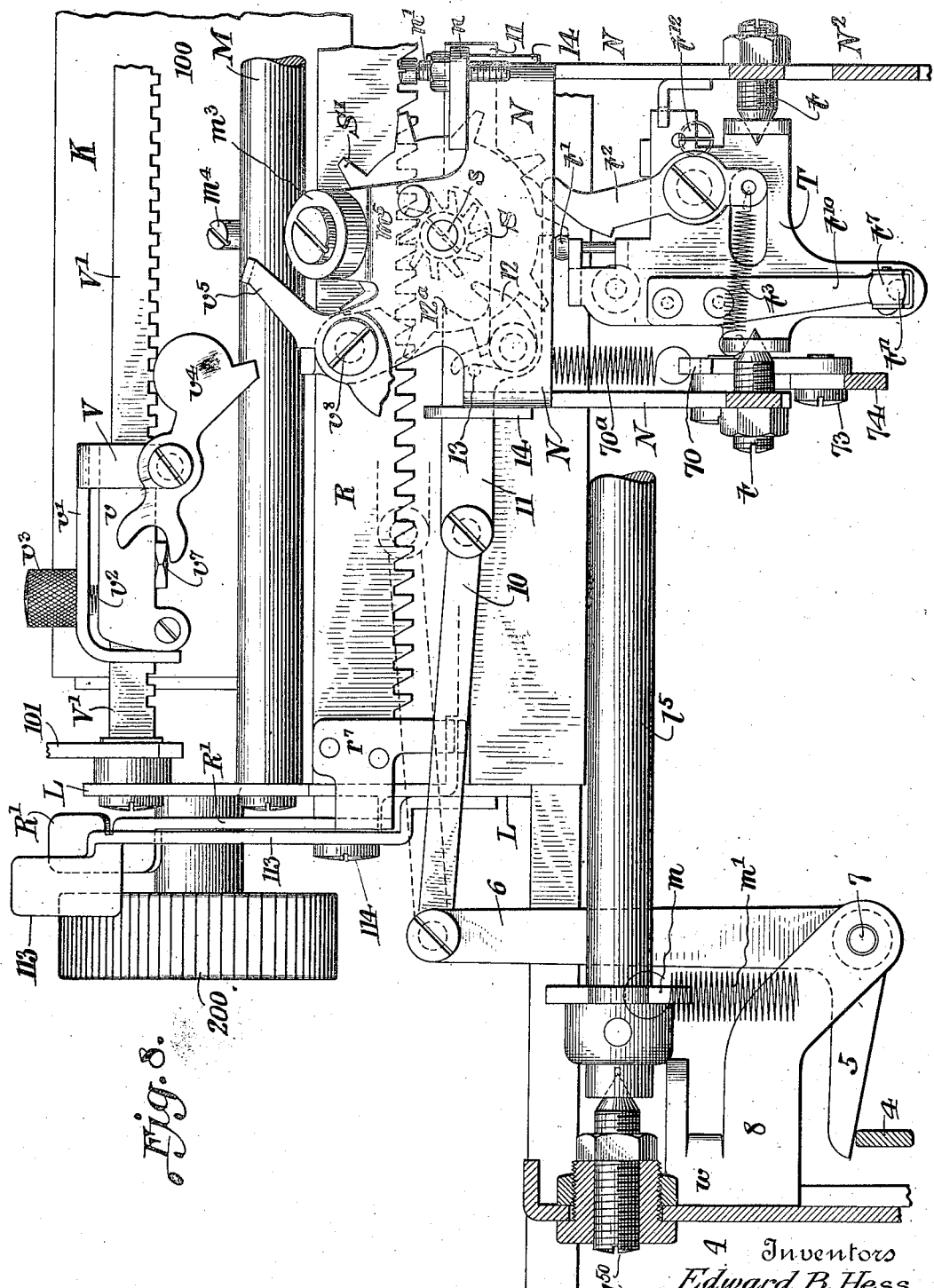

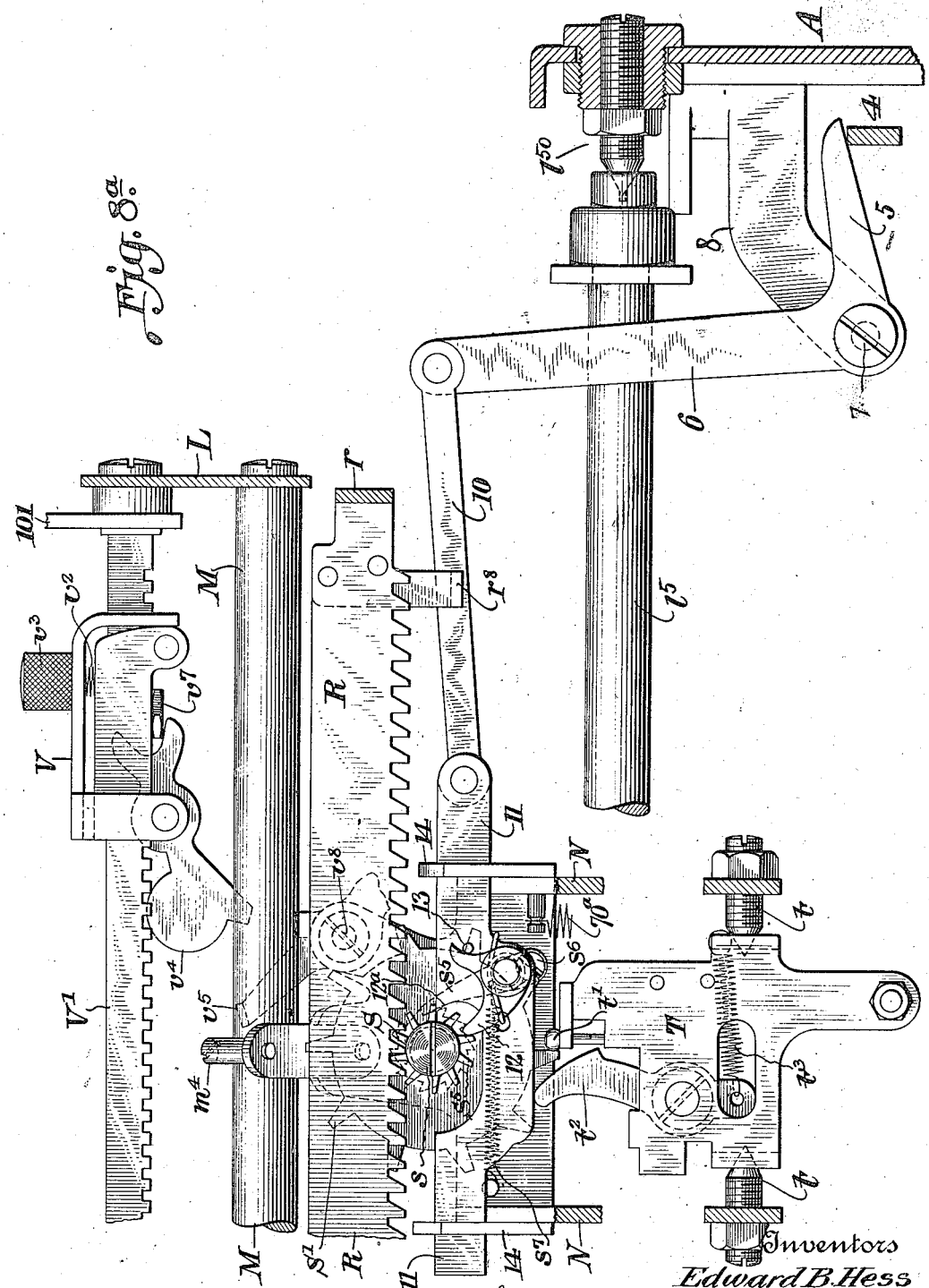

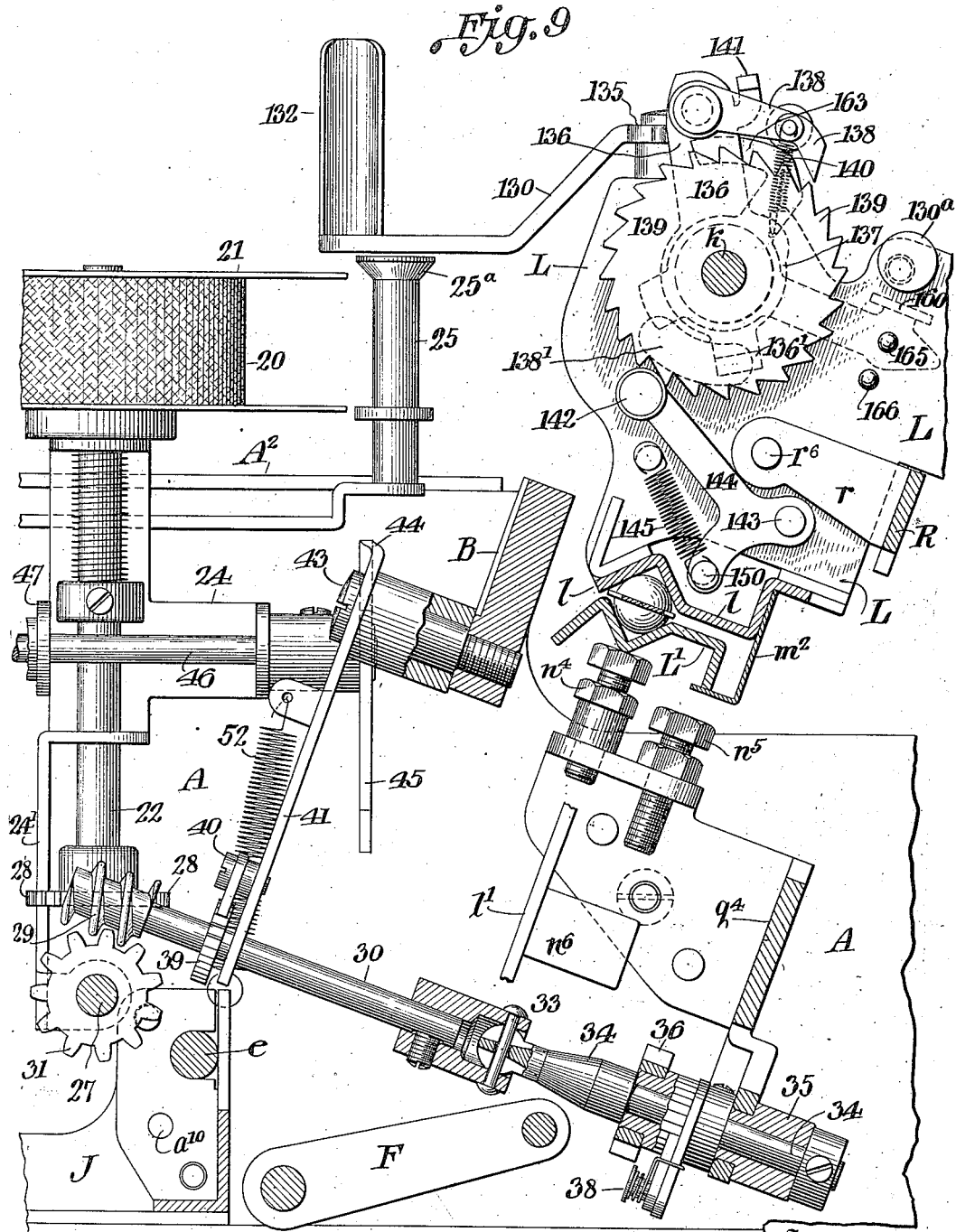

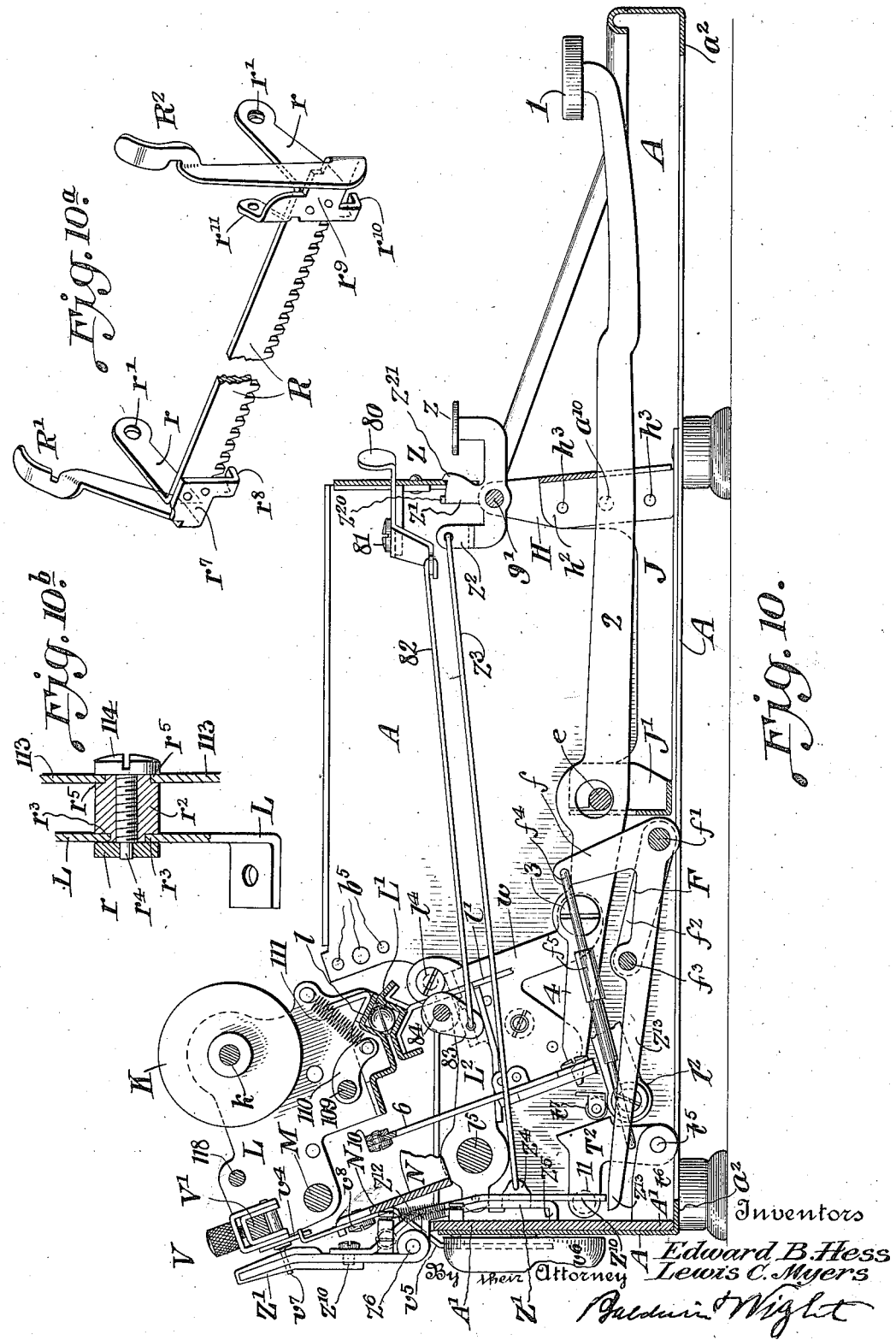

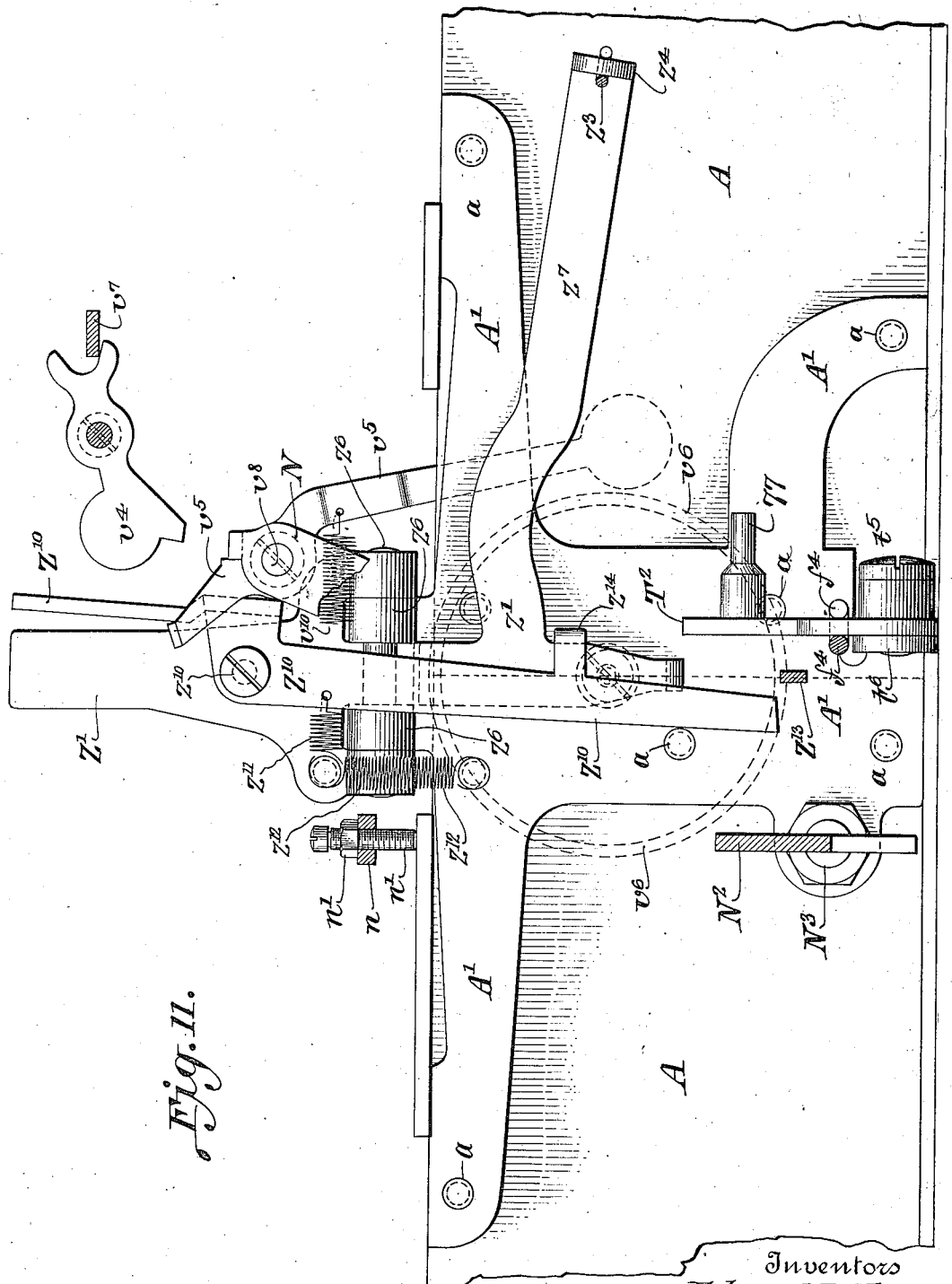

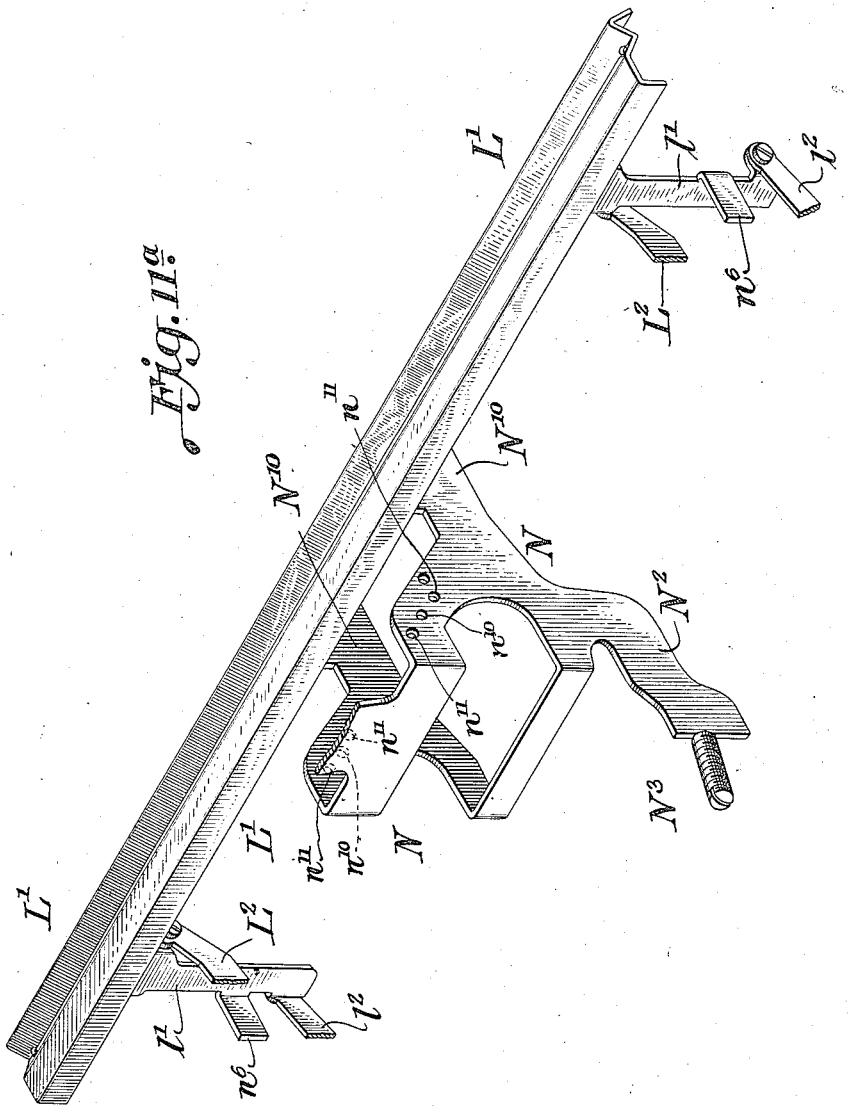

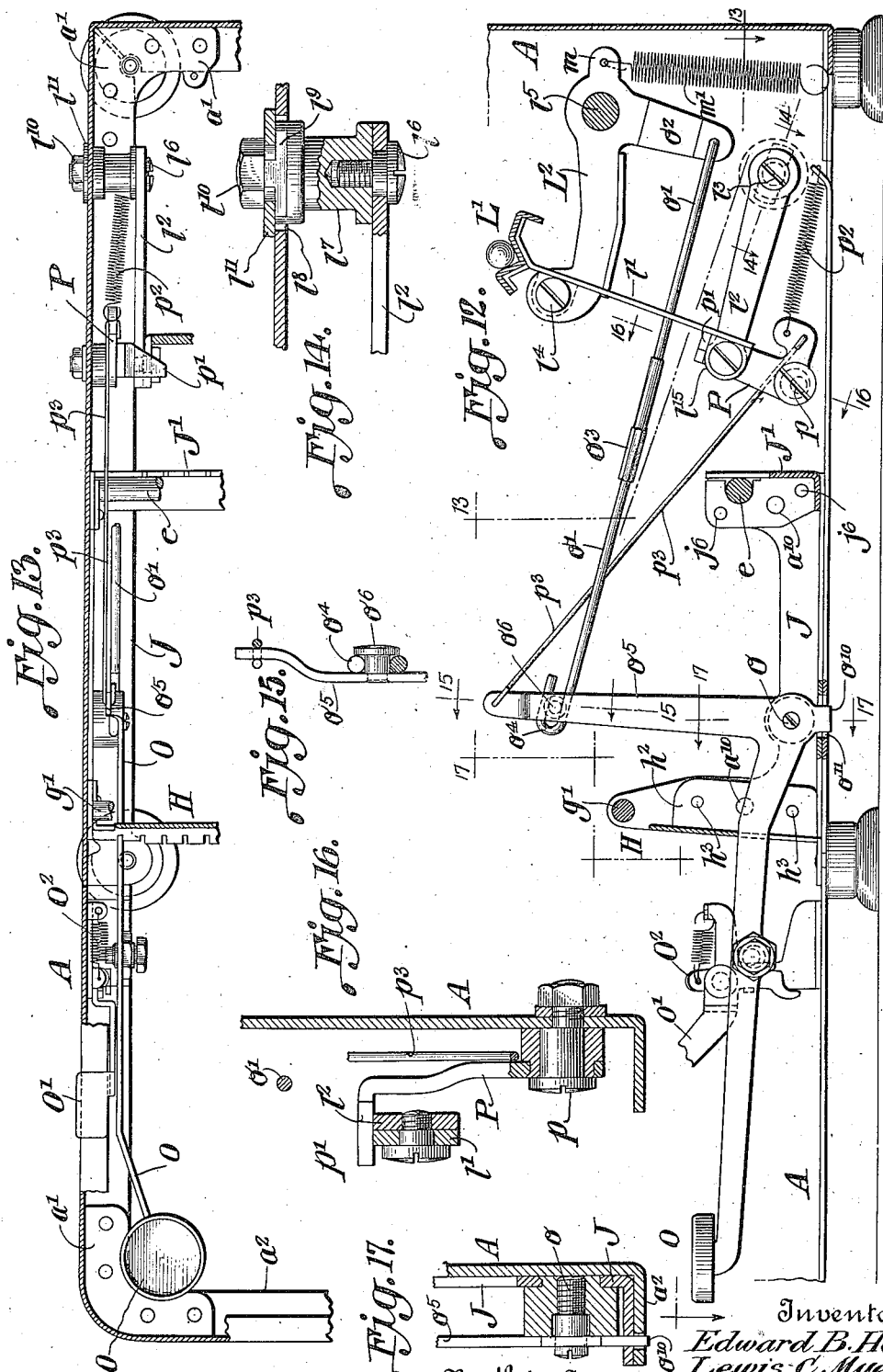

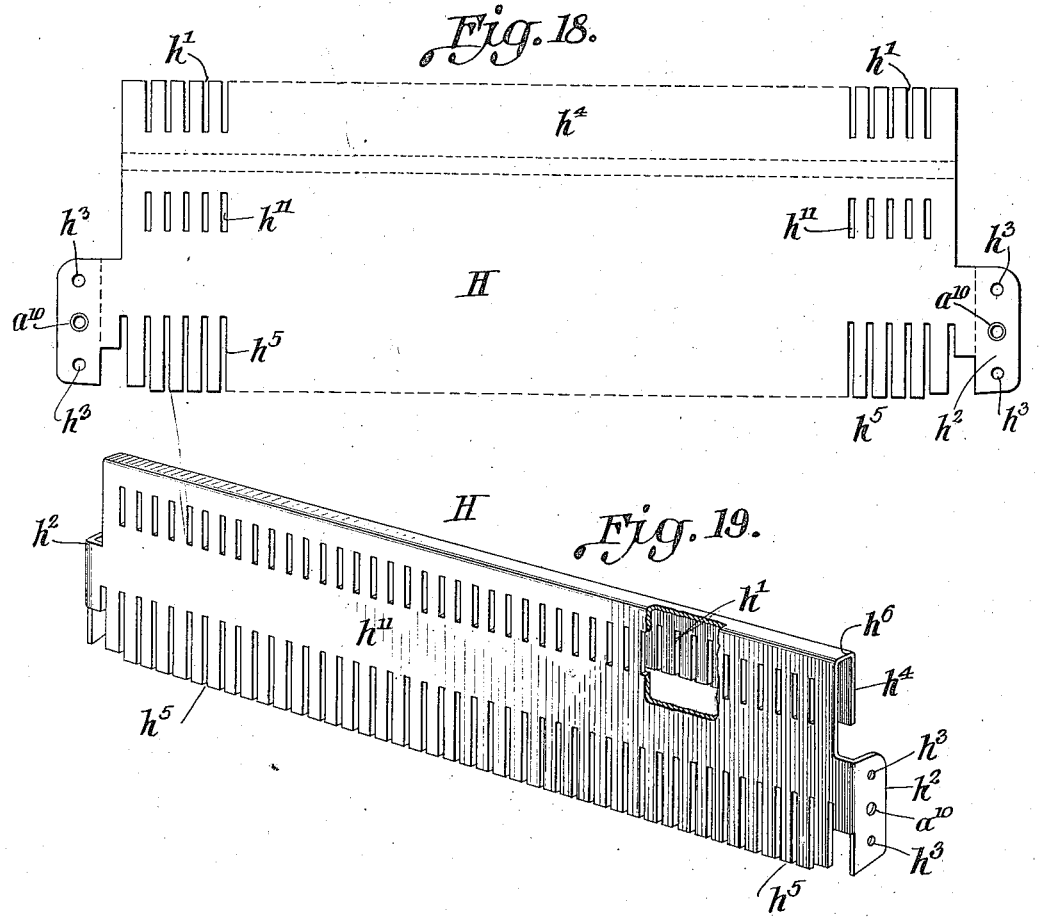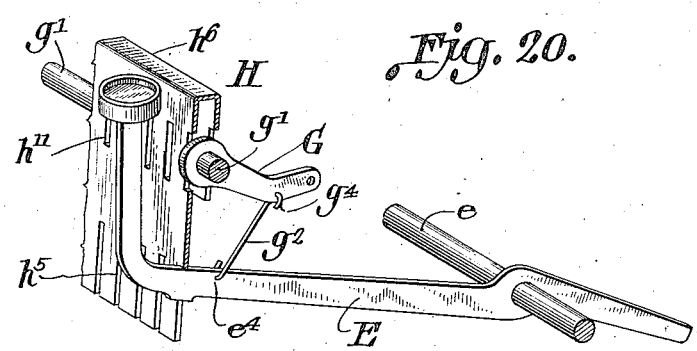

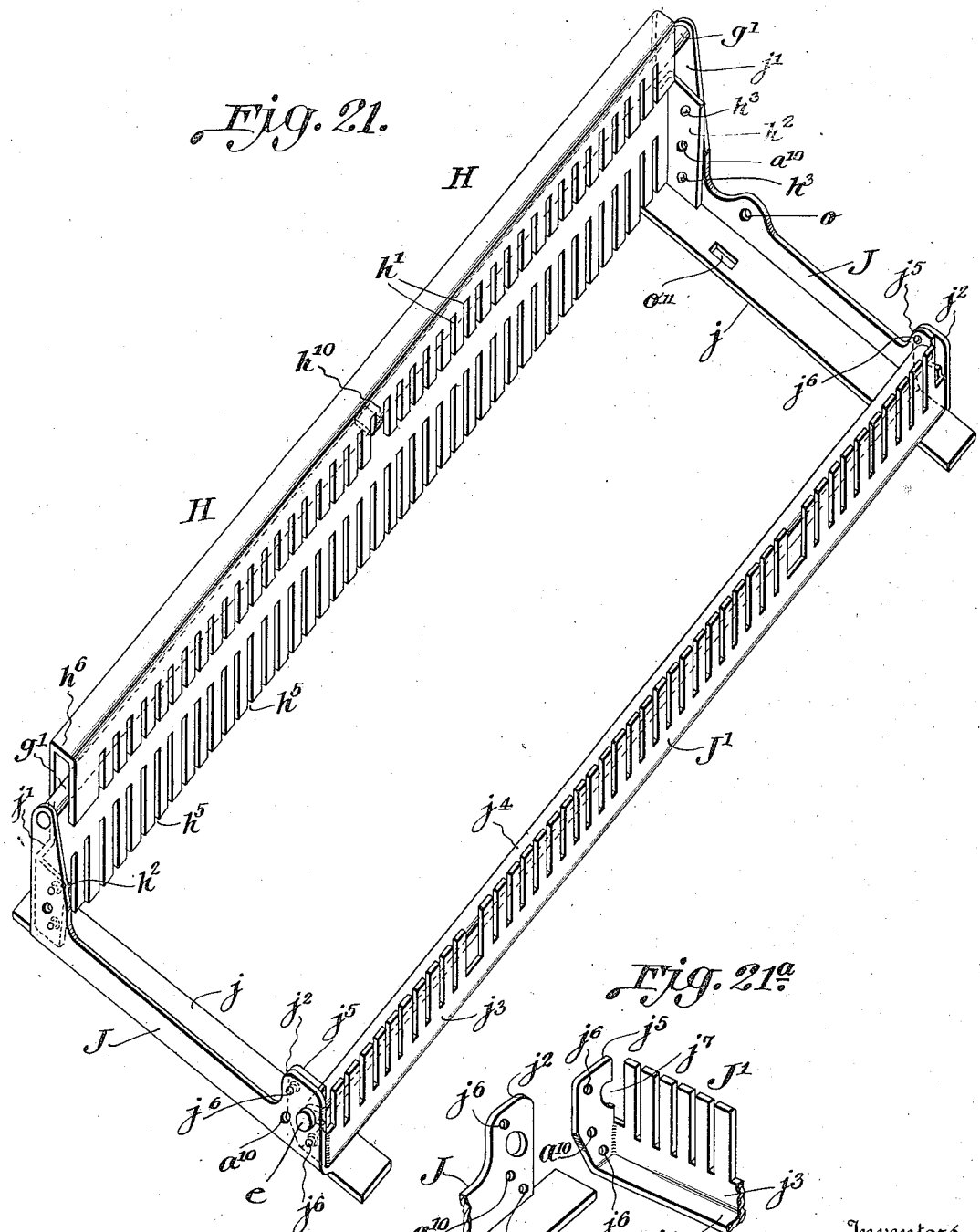
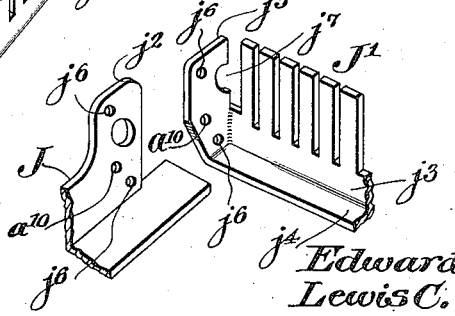

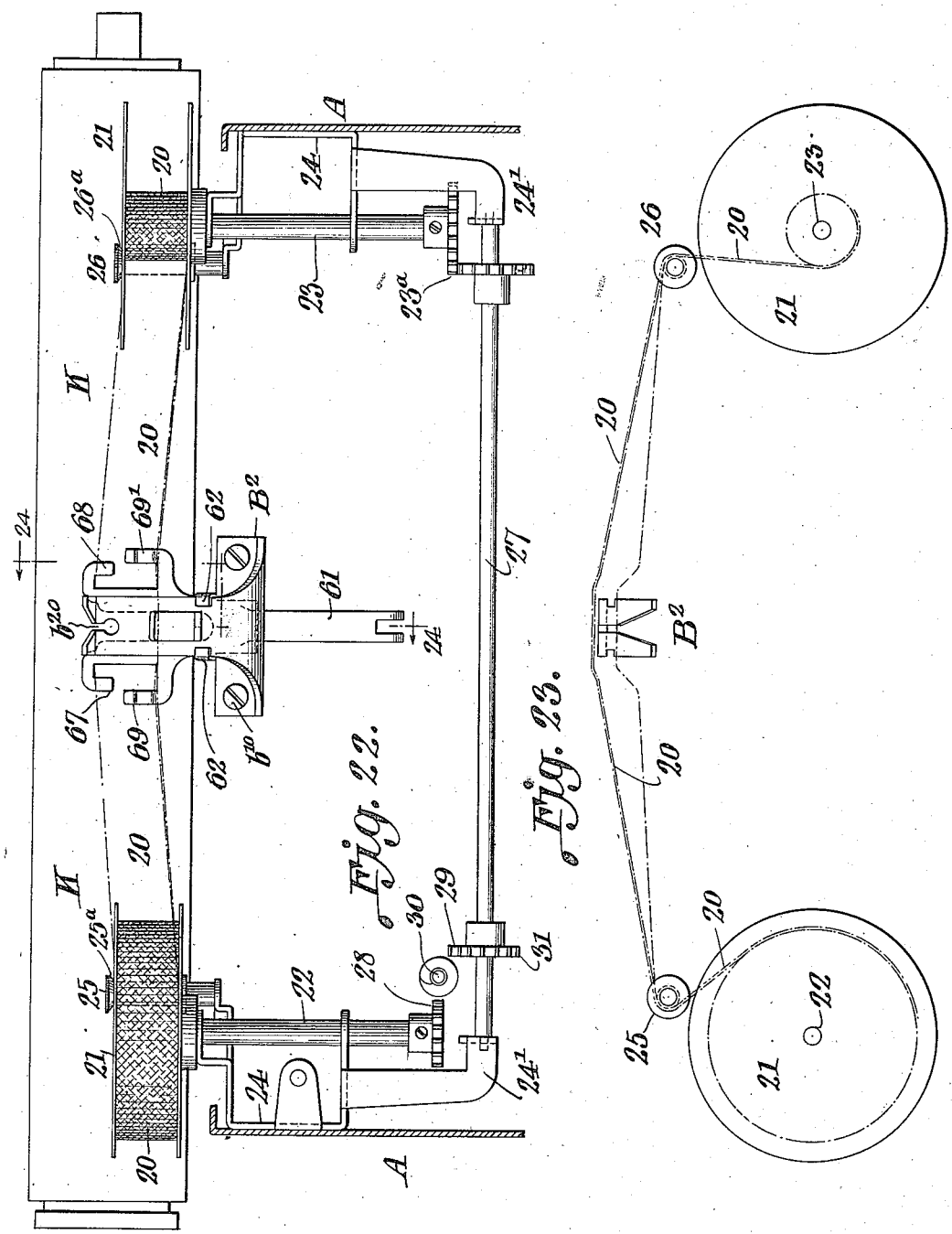

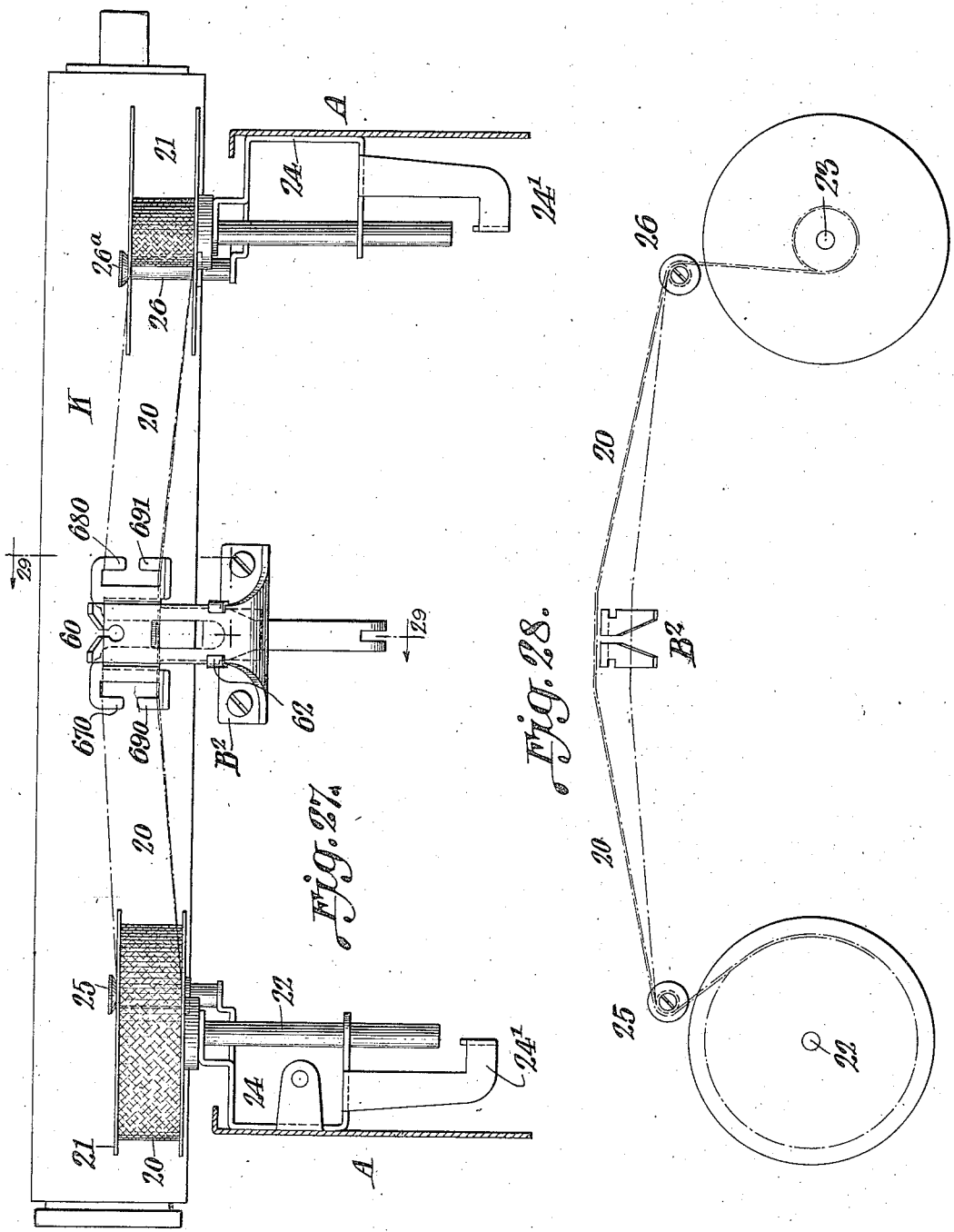

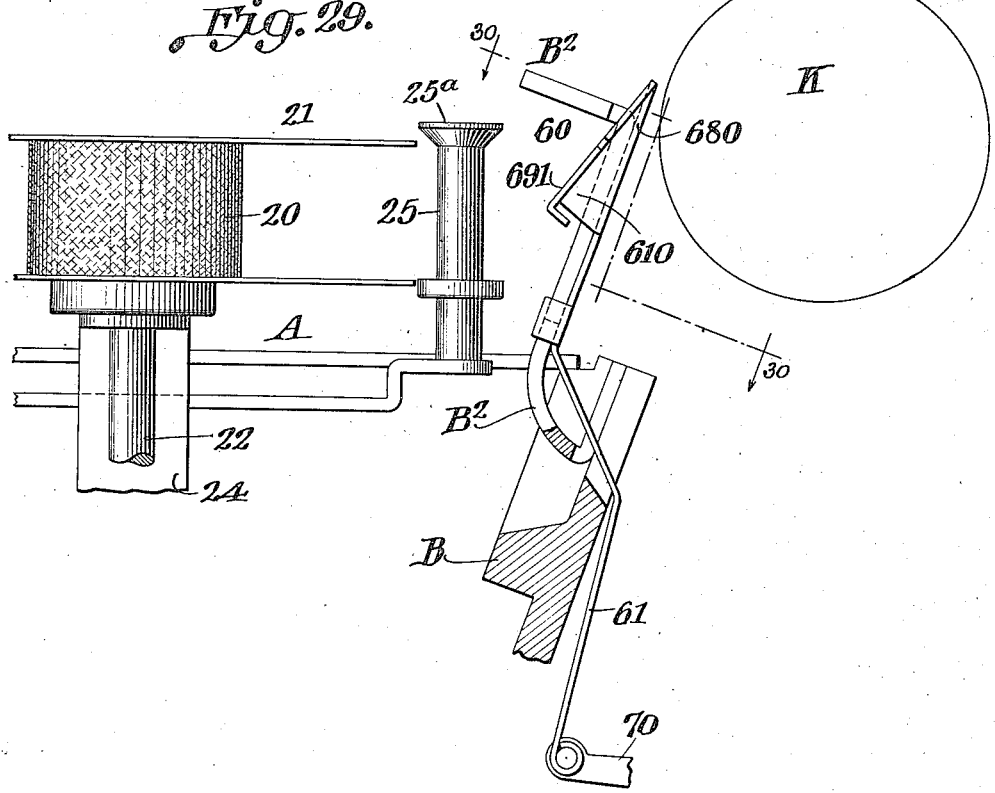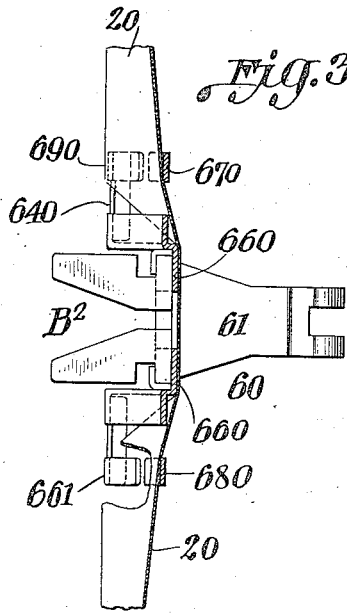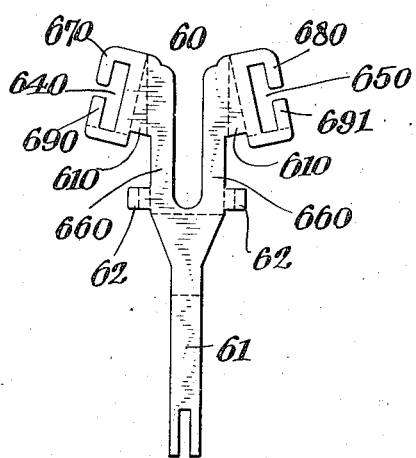

UNITED STATES PATENT OFFICE.

EDWARD BERNARD HESS AND LEWIS CARY MYERS, OF BROOKLYN, NEW YORK, ASSIGNORS TO ROYAL TYPEWRITER COMPANY, INC., OF NEW YORK, N. Y., A CORPORATION OF NEW YORK.

TYPEWRITING MACHINE.

1,418,440.    Specification of Letters Patent.    Patented June 6, 1922.

Application filed January 13, 1921. Serial No. 436,924.

*To all whom it may concern:*

Be it known that we, EDWARD BERNARD HESS and LEWIS CARY MYERS, both citizens of the United States, residing in Brooklyn, in the county of Kings and State of New York, have invented certain new and useful Improvements in Typewriting Machines, of which the following is a specification.

The object of this invention is to provide a small, compact, light and portable typewriting machine containing a complement of the essential parts of a standard, full-sized machine for ordinary writing, in which the writing is always visible, and which shall be at the same time strong, durable and easy to operate and in other respects efficient.

In carrying out our invention, we obtain these objects by embodying in the new machine as many as possible of the valuable and thoroughly tested features of the Royal typewriting machine, making such alterations as to adapt them to a portable machine of the kind above referred to.

We employ sheet metal and drawn stock to a very large extent in the construction of the machine in order to make the mechanism both strong and durable as well as light and compact. We use the full number of keys in the key-board, arranged in four banks, as in most standard machines; efficient mechanism is provided for shifting and locking the platen for upper and lower case printing; devices are used for "back-spacing" when desired; efficient line lock devices are used; the margin stops are adjustable as heretofore, and means is provided for releasing the margin stops at any desired point in the travel of the carriage; the ribbon is automatically vibrated and fed from one spool to another, and means is used to shift the ribbon-winding mechanism from one spool to the other. When a bicrome ribbon is employed it may be shifted to print in either color or the ribbon may be entirely disconnected from the winding mechanism. The most approved mechanism for feeding the paper to the platen is used, and novel mechanism is employed for controlling the feed of the paper so that the printing may be done with either single or double spaces. The new machine also embodies other desirable features common to the best machines in use as well as others which contribute to the ease of operation and the performance of the best quality of work. These will be hereinafter more fully described.

While many of the important and thoroughly tested features of the Royal machine are embodied in the new portable machine, it has been found necessary to change some of these features and to introduce certain new ones in order that the objects of the invention may be realized.

Inasmuch as the height of the new machine is considerably less than that of the standard Royal machine, the printing point on the platen has been placed considerably above a horizontal line drawn through the axis of the platen and the type segment has been inclined rearwardly and arranged obliquely with reference to the horizontal plane of the machine in order that the line of print may be properly presented to the eyes of the operator. This involves a new arrangement of the mechanism for connecting the key levers to the type bars in order that the latter may be properly moved from their points of rest to the printing point.

As in the Royal machine we employ a unitary printing platen carriage system and the general construction of the margin rail, center stop, escapement and ribbon-driving mechanism is similar, but the arrangement of some of these mechanisms has been somewhat changed. The platen carriage is so mounted and actuated that it moves in a plane oblique to the horizontal plane of the key levers; and the type bars are arranged in a fan-shaped field; i. e., the arc in which the inner ends of the type bars are pivoted is considerably smaller than the arc in which the type-carrying ends of the type bars are disposed when at rest.

The construction and arrangement of the mechanism in the new machine is such that all interference of one part with another in the transmission of power from the finger keys to the type bars, which is an essential though a difficult feature, in a compact, portable, full-standard keyboard machine, is avoided.

The key levers are connected with the type bars by flexing connections which exert a tensile strain on the type bars and pull them to the printing point with increasing or accelerated velocity as they approach the printing point. These connections between the type bars and the key levers are made between the finger pieces where power is applied and the fulcra of the levers and said levers are provided with extensions projecting rearwardly from the fulcra which engages a universal bar that controls the movement of the carriage. Thus the key levers, when acting upon the universal bar, are of the first order, and when acting on the type bar mechanism are of the second order.

Inasmuch as the type bars in the new machine are operated by tensile strain only between the key levers and the type bars, and as these connections are made in a novel way, the machine is not impaired in operation as in the case of machines where compression and lateral strain are present in such connections.

In the new machine the overhanging carriage is supported on a carriage track and that part of the carriage in which the escapement oscillates is formed with an extension projecting downwardly to a point where it contacts with an adjustment screw carried by the back portion of the base frame of the machine. In such construction the extension will not permit a rocking movement at its lower end and this prevents a fore-and-aft movement of the platen carriage. This way of sustaining the carriage upon its track may be applied to other types of machines, especially those in which the carriage runs on three bearing points instead of four, or where there is a tendency for an overhanging of the carriage either forward or backward and particularly when sheet metal parts are substituted for the heavy castings commonly used.

In the accompanying drawings illustrating our invention:

Figure 1 is a general plan view of the machine with some parts omitted.

Figure 1ᵃ is a detail view showing how an adjustable paper guide carried by the table may be used in connection with a scale on the table and a margin stop in rear of the table.

Figure 2 is a vertical section, taken in front of the type bar segment and looking towards the front of the platen.

Figure 3 is a longitudinal section, looking toward the left-hand side of the machine.

Figure 4 is a view, on an enlarged scale and in side elevation, of the rear portion of the right-hand side of the machine.

Figure 5 is a view similar to Fig. 4 of the left-hand side of the machine.

Figure 6 is a view, on an enlarged scale and in vertical section, taken near the center of the machine and looking towards the left-hand side of the machine.

Figure 7 is a rear view of parts of the mechanism at the rear of the machine, some parts being shown in section, on the line 7—7 of Fig. 6.

Figure 7ᵃ is a detail view of part of this mechanism.

Figure 7ᵇ is a view of the inside of the platen ratchet wheel.

Figure 7ᶜ is a sectional view of the platen.

Figure 7ᵈ is a view of the gudgeon at one end of the platen.

Figure 7ᵉ is a view of that end of the platen to which the gudgeon is applied.

Figure 8 is a view, on an enlarged scale, showing, in rear elevation particularly the mechanism at the rear portion of the machine and illustrating portions of the escapement mechanism and back space devices.

Figure 8ᵃ is a front view of the mechanism shown in Fig. 8.

Figure 9 is a view, on an enlarged scale, and shows particularly portions of the line-space mechanism and the ribbon-actuating mechanism.

Figure 10 is a view, in longitudinal section, showing portions of the back-space mechanism, the margin-release mechanism and the mechanism for shifting the ribbon when a bichrome ribbon is employed. It also shows the connection between the universal bar and the escapement rocker.

Figure 10ᵃ is a perspective view of the carriage rack bar (with a part broken away), its lifting levers, stops and supporting arms.

Figure 10ᵇ is a detail view in section showing how the rack supporting arm at one end of the rack is pivotally connected with the carriage.

Figure 11 is a view, on an enlarged scale, showing how the ends of the base frame are joined at the back of the machine, and shows also portions of the margin-release, line lock and ribbon mechanism.

Figure 11ᵃ is a perspective view showing particularly the carriage shift rail joined to the escapement rocker frame. It also shows the brace bar which extends rearwards from the escapement frame and the adjustable stop screw with which it co-operates.

Figure 12 is a view, in longitudinal section, showing portions of the mechanism for raising and lowering the carriage and for locking it in its adjusted position.

Figure 13 is a view of the same mechanism, in section, on the line 13—13 of Fig. 12.

Figure 14 is a detail view, in section, on the line 14—14 of Fig. 12.

Figure 15 is a detail view, in section, on the line 15—15 of Fig. 12.

Figure 16 is a detail view, in section, on the line 16—16 of Fig. 12.

Figure 17 is a detail view, in section, on the line 17—17 of Fig. 12.

Figure 18 is a view of the blank from which is formed a support for the front links of the type-bar-actuating mechanism and a guide for the key levers.

Figure 19 is a perspective view of this support and guide.

Figure 20 is a detail view, in perspective, showing how the front links are supported and how the key levers are guided.

Figure 21 is a perspective view of the assembly frame for the front links and key levers.

Figure 21$^a$ is a detail view of said frame.

Figure 22 is a view, in front elevation, of the preferred form of type guide and ribbon vibrator, and shows how the ribbon is directed from the ribbon spools to the vibrator.

Figure 23 is a plan view of the devices shown in Fig. 22.

Figure 24 is a view, on an enlarged scale, and in section on the line 24—24 of Fig. 22 of the mechanism shown in Figs. 22 and 23, and illustrates, in section, some features of this mechanism.

Figure 25 is a view, in section, on the line 25—25 of Fig. 24.

Figure 26 shows a front view of the ribbon guide and vibrator.

Figure 27 is a view, similar to Fig. 22, of a modified form of ribbon guide and vibrator.

Figure 28 is a plan view of the devices shown in Fig. 27.

Figure 29 shows a section on the line 29—29 of Fig. 27.

Figure 30 shows a section on the line 30—30 of Fig. 29.

Figure 31 is a front view of the blank for the ribbon guide and vibrator, shown in Figs. 27 and 29.

The base A of the machine is made of thin, light, but stout and strong sheet metal which is blanked out from a single sheet in suitable form to provide the sides, back, front and part of the top portions of the base. Separate front top plates A$^2$ are employed and they are secured in place at $a^5$. The frame serves as a base support for all of the mechanisms and a casing for portions thereof. The top plates A$^2$ serve as a dust-shed for parts of the mechanism. The two ends of the sheet metal frame are brought together at the back of the machine, as indicated in Fig. 11, and are connected by a sheet metal tie-plate A' of general T-shape and which is riveted to the opposite ends of the frame as indicated at $a$. This plate extends from the bottom of the frame (Fig. 6) to a plane slightly above the upper edge of the back thereof. This plate in addition to tying together the ends of the frame at the back of the machine serves also to support parts of the mechanism as will be hereinafter described. While a frame thus constructed is strong and quite rigid, we prefer to impart additional strength and rigidity thereto by placing suitable sheet metal reinforcing members $a'$ at the four corners inside the frame. The edges of the sides of the frame are turned inward or flanged as indicated at $a^2$ and the top is properly shaped to permit certain parts of the mechanism to project through it.

The segment B to which the type bars C are pivoted is of cast metal, and it may be here stated that this member is the only one in the machine which is cast, all other metal parts being of the lightest possible character. This part is made particularly strong and rigid inasmuch as it sustains a large number of type bars, which must be pivotally mounted in such manner as to be moved with the greatest accuracy and precision toward and from the printing point on the platen. Lateral extensions of the segment are securely fastened to the sides of the base frame at $b^5$. The segment serves to support other parts of the mechanism as will be hereinafter described.

It will be observed that the segment is arranged at an oblique angle to the horizontal, this angle being obtuse to the plane of the key levers as indicated in Fig. 3. The segment is formed with a curved rib $b$ which provides a striking surface for the type bars intermediate their ends and insures the impact of the type at the proper point without undue penetration of the material to be printed upon.

The type bars C are thin, light and strong, being made of sheet metal, preferably corrugated, as indicated at $c$. Their inner ends are disposed in slots $b'$ cut in the lower portion of the segment and they are pivoted to a curved rod or wire $b^2$ at the inner ends of the slots.

The type carrying ends of the type bars rest on a support C' secured at its ends as shown at $c^{12}$ to suitable brackets $c^{10}$ on the frame. The support C' is suitably cushioned and so disposed as to normally hold the type bars at an obtuse angle to the plane of the segment, but in this case the arc of the support is materially greater than that of the inner bearing points of the segment. In this way the pivoted ends of the bars may be brought close together while the outer ends thereof may be spread so that the type carrying ends of the bars may not interfere. In this way also space is provided in the neighborhood of the segment for accommodating parts of the mechanism.

As shown in Figs. 1 and 3 the front part of the machine between the top plates A$^2$ and in front of the support C' is closed by a bridge piece A$^3$ which is attached to the front plates in the manner indicated at $a^{10}$. The upper part of this bridge piece is curved in the manner shown and it has a downwardly extending portion $a^{11}$ (Fig. 3), which reaches to the front lever support H and covers the mechanism immediately in rear of it. In this way the top plates A$^2$ and the bridge piece $A^3$ serve to protect to a very great extent parts of the mechanism. It will be observed that the type heads are covered by the bridge piece $A^3$ and furthermore that the curved middle portion of this bridge piece is below the top plates $A^2$ so that the platen and parts immediately below it are distinctly visible.

It will be also observed that while the mechanism in the rear part of the machine is obliquely arranged the parts in the front portion of the machine, excepting the type bars, are, in general, arranged horizontally. The top plates $A^2$ are arranged in a true horizontal plane and the ribbon spools whose shafts extend through the plates $A^2$ are arranged horizontally somewhat below the line of print and they lie above the plane of the top plates of dust-sheds $A^2$. The part $A^3$ serves to bridge the space between the two plates $A^2$ at the front of the machine and in this way the mechanism is shielded in a most thorough and efficient way, only such parts as it is necessary or desirable to see being uncovered. The bridge piece $A^3$ may be joined with the top plates and attached thereto as indicated at $a^{10}$, or in other suitable ways.

The type bars are normally held on their rest or are returned thereto by individual springs $c^2$ (Fig. 3) attached to a flange $c^3$ of the rest and to the type bars near their inner ends in front of and above their pivots. The key board contains the standard number of type keys, viz, 42 arranged in four rows or banks, and it also contains keys for operating the carriage shift, back-space and margin release mechanism. Each of the forty-two key levers E is of the first order being fulcrumed on a common rod $e$, its front portion being connected to a type bar between the fulcrum and the finger piece, while the rear part of the lever is extended rearwardly from the fulcrum and operates on a universal bar F. Each key lever, therefore, when operating on the universal bar is of the first order, but when operating a type bar it is of the second order inasmuch as at this time the weight is situated between the lever and the fulcrum.

The universal bar is also operated by a space bar $D^{10}$ carried by the front ends of levers $d^{10}$ pivoted to the rod $e$ and having extensions operating on the universal bar in the same manner as the type key levers. The rear portions of the levers $d^{10}$ are connected by a tie bar $d^{11}$. A stop for the space bar is shown at $d^{12}$.

The heels $c'$ of the type bars below and behind their pivots are connected by links $g$ to the rear ends of the short bent links G pivotally mounted on a common pivot rod $g'$ which is supported in a frame of novel construction. Each link G is connected by a link $g^2$ to a corresponding key lever E. The links $g^2$ are made of wire, the ends of which are bent and pass through holes $g^3$, $e^3$ in the links G and levers E respectively. The ends of the links $g^2$ are bent or hooked as indicated at $g^4$, $e^4$ (Fig. 20) where they engage the levers. In order that the levers may be placed close together to economize space and that the bent ends of the links may not interfere with each other, the links are connected with the levers at different distances from their pivots as shown in Fig. 3.

The rear ends of the key levers move different distances inasmuch as the levers are of different lengths. Therefore, the rear ends of these levers are inclined at different angles and in such manner as to give to the universal bar the same movement whichever key is operated.

The support H for the front links G is preferably constructed of a single piece of light, strong sheet metal and it is also preferably so constructed as to provide a comb guide for the front portions of the key levers.

Figure 18 shows a sheet metal blank from which the support and guide may be constructed. One part of the blank is provided with two series of parallel slots $h'$, $h^{11}$, to accommodate the front ends of the links G while the opposite portion of the blank is formed with a series of parallel slots $h^5$ to accommodate the key levers. Each end of the blank is formed with a wing or extension $h^2$ having holes $h^3$ to receive rivets for securing the support to a frame. The blank is bent on the dotted lines indicated in Fig. 18 to cause the part $h^4$ of the support to extend rearwardly and then downwardly parallel with the body of the support. The rod $g'$ to which the front levers are pivoted is disposed between the front and rear portions of the upper part of the support and fits snugly therein. It is supported at its ends and also mid-way between its ends as shown by a loop $h^{10}$ formed from the support H. This rod is held in such manner as to cause the rear portions of the front links to extend through the rear slots $h'$ which are open at their lower ends and through the front slots $h^{11}$ which are closed at both ends. These slots $h'$, $h^{11}$ are, of course, in line with each other.

The slots $h^5$ are open at their lower ends to allow the key levers to work through them, and the wings $h^2$ at opposite ends of the support are bent rearwardly at right angles to the body portion to afford means for securing the support to its frame.

It will be observed that the pivotal connection of the front links with the support is covered and protected by the top of the support, which latter is mounted in a frame consisting of two side pieces J Fig. 21, each having a flat horizontal base $j$, a front vertical arm $j'$ and a rear vertical arm $j^2$. The wings $h^2$ of the support are riveted to the arms $j'$ at $h^3$ and the pivot rod $g'$ is supported in the upper ends of the arms. The pivot rod is also centrally supported by a loop $h^{10}$ formed in the support H as shown in Figs. 3 and 21. The rear ends of the frame pieces J are connected by a comb guide $J'$ for the key levers. This guide consists of a slotted vertical rear part $j^3$, a bottom part $j^4$ and two side portions or wings $j^5$. These parts are all made from a single piece of sheet metal bent to shape and secured in place. The frame pieces J are secured to the wings $j^5$ at $j^6$ and each of the wings $j^5$ is perforated at $j^7$ to receive the rod $e$ to which the key levers are pivoted. The frame as a whole is secured to the base frame A at $a^{10}$.

The support H and the frame in which it is mounted provide what may be called an assembly frame for the short front links and for the key levers. These may all be mounted in the support and these links and levers thus assembled may be placed in position within the base frame of the machine.

The means described for connecting the key levers to the type bars affords a flexing connection between these members and a tensile strain is imparted through the links $g$ from the key levers to the type bars. Furthermore, the connections are such that the types approach the printing point with an accelerated movement which is at first comparatively slow, when the keys are first touched, and they rapidly increase in speed as the depression of the keys continues. Inasmuch as the platen is arranged in an obliquely disposed carriage and the printing point is above the horizontal axis of the horizontal plane of the axis of the platen the connections between the key levers and the type bars are such as to give the required movement to them.

The arrangement of the type bar operating devices is such as to procure substantially uniform depth of depression and approximately uniform "touch" of all the finger pieces of the key board. The shorter key levers, whose finger pieces $x'$ are in the rear row of the key board are each connected to one of the longer links G by a link $y'$ extending upwardly from the corresponding key lever, the points of connection of the link $y'$ to the link G and to the key lever being such as to afford the desired extent of depression of the finger piece $x'$ of the key lever to throw the corresponding type bar to the printing point. The next longer key levers whose finger pieces $x^2$ are in the second row from the rear in the key board, are also each connected to a link G by a link $y^2$ but the point of connection of the latter link to the link G is nearer the fixed axis about which the link G moves than is the corresponding link connection of the shortest key lever. The relationship of the parts and leverages is such that the finger pieces $x'$, $x^2$ of the two rear rows have the same extent of depression and the same "touch." The next longer levers whose finger pieces $x^3$ are disposed in the second row from the front of the key board are each connected to one of the shorter front links G as shown in Figure 3 by a link $y^3$. The distances from the axes of these shorter links G and from the axes of the corresponding key levers at which the connections of the vertical links are made are such as to afford a depth of depression of the finger pieces, the same as that for the finger pieces $x'$, $x^2$ in the two rear rows and also of substantially the same touch.

Each lever carrying a finger piece $x^4$ in the front row of the key board is connected to one of the shorter front links by a vertical link $y^4$. The connection of the latter link to the front link G is nearer the fixed axis thereof than is the connection between the key levers of the third row and such axis. The finger pieces $x^4$ of the lower row in the key board have the same extent of depression as the others and substantially the same touch. As the front links G are made alternately long and short, the staggering of the ends of the links with reference to a straight, transverse line affords ample room for the hooks, by which the links $g$ and $g^2$ are attached to the links G so that in the operation of the machine one cannot interfere or collide with another. Each front link G is of elbow shape, its lower front end being bent upwards. The point of connection of the type bar link $g$ to the corresponding link G is thus made at a higher point than heretofore. In this way we are enabled to reduce to some extent the height of the machine and parts of the mechanism are made to so co-operate as to effect the full throw of the type bars. Furthermore, the requisite clearances are obtained between moving and stationary parts.

The platen K is mounted in a carriage, the side pieces L of which are shown in the drawings. These sides are connected by a sheet metal rail $l$ supported by a sheet metal carriage shift rail $L'$, having downwardly extending legs $l'$, the lower ends of which are pivotally connected with the front ends of links $l^2$, the rear ends of which are pivotally connected with the sides of the base frame of the machine as indicated at $l^3$. The front ends of the carriage lifting levers $L^2$ are pivotally connected with the shift rail at $l^4$ while the rear ends of these levers are secured to a horizontal rock shaft $l^5$, mounted to turn in bearings $l^{50}$, preferably of the kind shown in Fig. 8, said bearings being carried by the sides of the base frame.

It will be observed that the carriage frame is arranged obliquely, the rails $l$ and $L'$ having their opposite surfaces rearwardly and downwardly inclined at a slight angle, and in order to adjust this angle the pivots of the links $l^2$ are made adjustable, as indicated in Figs. 12 and 14. As there shown, each link $l^2$ is connected by a screw $l^6$ to a sleeve or spacer $l^7$ and is free to turn thereon. The spacer extends through a slot $l^8$ in the side of the frame A and has a flattened portion $l^9$ therein. The spacer carries a nut $l^{10}$ between which and the sides of the frame a washer $l^{11}$ is interposed. Each of the links $l^2$ is mounted in this way, and by these devices the inclination of the carriage may be adjusted. The rock shaft $l^5$ carries a rearwardly extending arm $m$ connected with a vertically arranged coiled spring $m'$ attached to the lower portion of the base frame and which serves to, in a measure, counterbalance the weight of the carriage and to assist in elevating it. By the devices described the carriage may be given adjustments by which the printing point of the platen may be slightly varied in order that the type bars may properly abut the ridge $b$ on the segment and that the type may strike the platen at the proper point and with suitable force.

There are anti-friction ball bearings interposed between the rails $l$ and $L'$ of the kind commonly used in the Royal machine and the rails $l$, $L'$ are held properly connected by adjustable clamping plates $m^2$. The rails $l$, $L'$ are made of light but tough and strong sheet metal bent to the required shape.

As shown in Fig. 7 and also in Fig. 7ª, the screws $m^{10}$ which hold the plates in place extend through holes $m^{11}$, larger in diameter than the screws. It will be observed that there are two clamping plates employed and that they are capable of adjustment by the devices just described in any necessary direction, so that the top rail and shift bar of the carriage mechanism are always held in proper relation to each other by the clamping plates when they are properly adjusted. It is desirable that each plate should be continuous as shown, instead of divided into separated sections, in order that the shift rail and the top rail of the carriage may be held together, not only when the carriage is arranged centrally in the machine but also when it projects from either side thereof.

In order to further support and guide the carriage, we provide a guide bar M which is secured to the sides of the base frame and this bar co-operates with a roller $m^3$ and a pin $m^4$ carried by an arm $m^5$ projecting upwardly and forwardly from the frame N of the escapement mechanism (Fig. 4).

In order to shift the platen carriage for upper and lower case printing, we employ a shift key O pivoted at $o$ to the frame J and having its upwardly projecting arm $o^5$ connected by a link $o'$ to the lower end of an arm $o^2$ extending downwardly from one of the lifting levers $L^2$. The link $o'$ is provided with adjusting devices $o^3$ by means of which its length may be changed and its front end is formed with a loop $o^4$ which engages a pin $o^6$ on the lever in order that the lever may have a slight movement before moving the rod, and the lifting lever connected therewith. By depressing the finger-piece of the lever O the latter may be operated to elevate the carriage for upper case printing and hold it as long as the finger of the operator is held on the key. When it is desired to hold the carriage in elevated position for printing a plurality of capitals, a lever O' may be depressed which serves to lock the carriage shift key. The mechanism shown at $O^2$ for thus locking the shift key is of well known construction and need not be described in detail. Suffice it to say that when this key is depressed it holds the carriage in upper case position until the shift key is operated to release it.

In order to lock the carriage in lower case position, we employ a latch P (Fig. 12) in the form of a bell crank lever of general L-shape. It is pivotally mounted at $p$ and its upper end carries an arm $p'$ which engages the ear $l^{15}$ which projects forwardly from one of the legs $l'$ of the carriage support. The lever P is normally inclined from its lower end upwardly and rearwardly and this upward rearwardly extending portion of the lever is connected with a spring $p^2$ attached to the base frame. The latch P is connected by a link $p^3$ with the upper end of the arm $o^5$ of the lever O and when the shift lever is operated the latch P is first released from the carriage and then the shift lever serves to raise the carriage to the desired extent. It will be observed that the link $p^3$ is connected to the latch in rear of its pivot and when the shift key is operated the latch is turned quickly to release the carriage and before the shift key can operate. Furthermore, it will be seen that the latch is so located and mounted that its upper front portion does not at any time come in contact with the frame J' in front of it. The lower portion of the lever O is provided with an extension $o^{10}$ which projects through openings $o^{11}$ in the frame J and the base frame of the machine. By this construction the lever is guided in its movements.

The carriage is moved from right to left during the operation of printing a line by a strap $q$ connected to a spring drum Q housed in a suitable casing. The tension of the spring may be regulated by devices $q'$ of well known construction. The spring drum is carried by an arm $q^3$ of a bracket $q^4$ secured to the left-hand side of the base frame and this bracket serves to support parts of the ribbon-operating mechanism as will be hereinafter described.

In order to control the transverse movement of the carriage appropriate escape mechanism is provided. R indicates a rack bar having its opposite ends bent to form arms $r$, which are disposed at right angles to the toothed portion of the bar. These arms are perforated at $r'$ to receive pivot screws which connect them with the opposite side plates L of the carriage. The arm $r$ at the right-hand end of the bar is connected with the carriage in the manner indicated in Fig. 10$^b$, where L indicates a side plate of the carriage, 113 a paper release lever, 114 a pivot screw and $r^2$ a spacing sleeve. A reduced portion of the sleeve $r^2$ is riveted to the plate L at $r^3$ and the sleeve is internally threaded to receive the pivot screw 114. The inner end of the screw is reduced and shouldered, as shown at $r^4$, and enters the hole $r'$ in the adjacent rack arm. The outer end of the sleeve is reduced and shouldered at $r^5$ to receive the paper release lever 113, which is held in place by the head of the screw, but is free to turn on the part $r^5$ of the sleeve. The arm $r$ on the opposite end of the rack bar is pivoted to the adjacent carriage end plate L in the manner indicated at $r^6$, Fig. 5.

Carriage release levers R', R$^2$ are connected with the rack bar and are employed for lifting the rack bar out of engagement with its operating pinion. The lever R' is formed integrally with an arm $r^7$, which is riveted to one end of the rack bar and this arm is formed with a stop $r^8$ which serves to limit the movement of the rack bar when it returns to normal position to engage the pinion. The lever R$^2$ is likewise formed with an arm $r^9$ secured to the opposite end of the rack bar and this arm carries a stop $r^{10}$, similar to the stop $r^8$, and serving a similar purpose. The arm $r^9$ is formed with a lug $r^{11}$ to which is attached a spring $r^{12}$ (Fig. 6) which serves to return the rack to normal position in engagement with its pinion.

In this way we provide what may be termed an integral carriage rack bail, the rack, its supporting arms, its lifting levers and its stop being all assembled and connected in such manner that they may be readily placed in position in the machine and connected with the carriage in assembling the mechanism and may as readily be withdrawn from the carriage whenever desired.

The pinion S is secured to a short shaft $s$ which also carries an escapement wheel S'. As usual the spring drum tends to move the carriage from right to left while the escapement mechanism controls this movement.

The escapement rocker T is pivotally mounted at $t$ in its frame N and is provided with a roller-carrying fixed dog $t'$ and a limber dog $t^2$ pulled in one direction by a spring $t^3$. As the rocker oscillates the carriage moves from right to left step by step in the usual way. The rocker is operated by a lever T$^2$ (Fig. 10) pivoted at $t^5$ to an arm $t^6$ extending forwardly from the tie bar A'. This lever engages a roller $t^7$ on a downwardly extending spring arm $t^{10}$ of the rocker. The tension of the spring arm is adjusted by a screw $t^{11}$ (Fig. 6), carried by the rocker. As the lever T$^2$ is oscillated the rocker is correspondingly moved and operates the escapement mechanism.

The lever T$^2$ is operated by an arm $f$ projecting from the shaft $f'$ of the universal bar F, which latter comprises the shaft $f'$, two side pieces $f^2$ and a rear crosspiece $f^3$. The arm $f$ of the universal bar is connected with the lever T$^2$ by a link $f^4$, the length of which may be varied by the devices $f^5$. It will be observed that the universal bar or universal bar frame is arranged horizontally or nearly so instead of vertically, as in prior constructions. In this way it is adapted to a frame of small height or size and it is also adapted to be operated directly by the extensions of the key levers and the space levers. Fig. 3 shows clearly how this is done. It will be observed that the key levers when operating on the universal bar are of the first order and there is no mechanism interposed between the key levers and the universal bars. This affords a compact, simple and efficient construction.

The rocker is operated in one direction by a spring $t^{12}$, as usual, and as indicated in Fig. 8.

It will be observed that the frame N of the escapement mechanism has a bracket $n$ in which is mounted a set screw $n'$. This screw is adapted to engage the top of the flanged rear portion of the base frame when the carriage is returned after being raised. The screw thus acts as a back stop for the carriage arranged centrally of the machine and this stop co-operates with other stops $n^2$, $n^4$. The stops $n^2$, $n^3$ on the right-hand side of the machine are carried by a bracket $w$ to which the back space lever is pivoted while the stops $n^4$, $n^5$ on the left-hand side of the machine are carried by the bracket $q^4$ which supports the spring drum and parts of the ribbon mechanism. By these devices the oblique movement of the carriage is accurately controlled. The set screws $n^2$ and $n^4$ arrest the downward movement of the carriage by engaging the shift rail L', while the screws $n^3$, $n^5$ arrest its upward movement, being arranged to abut against arms $n^6$ on the downwardly extending legs $l'$ of the shift rail.

An arm N$^2$ extends from the escapement frame N and projects downwardly and rearwardly therefrom, its lower end abutting against an adjustment screw N$^3$. This arm, as shown in Fig. 6, and also in Fig. 11$^a$ is in the form of a thin plate arranged longitudinally of the machine and as shown is formed integrally with the escapement frame. The arm serves to steady the carriage and prevent it from tilting or moving forward. It will be understood that the escapement frame N is connected with and supported by the lower shift rail L', as shown in Fig. 11ª. This connection is similar to that in the Royal Standard machine. (See $N^{10}$ Figs. 6 and 11ª.) Inasmuch as the carriage overhangs its front supports, and as the carriage is a floating carriage, being supported at the front by the shift rail, which is in turn supported by swinging links and levers, there is a tendency for the carriage to sag, but by means of the brace arm $N^2$ in co-operation with the front supports of the carriage this tendency is obviated, as by means of the set screw $N^3$ a tortional strain can be imparted to the sub frame of the carriage which will cause it to always maintain its proper oblique arrangement without any material change. The set screw $N^3$ extends through the back frame and through the tie plate A' as indicated in Fig. 6. In this way we provide what may be termed an aligning arm which extends from the shift rail or carriage support to a rigid abutment.

The extent to which the carriage may be moved in either direction is controlled by the margin stops V mounted to slide on a toothed margin stop rail V' secured to the side plates of the carriage. Each of these stops comprises a sheet metal frame $v$ carrying a dog $v'$ pressed upwards by a spring $v^2$ and operated by a knob $v^3$. The stop on the right-hand side of the margin rail carries a trip lever $v^4$ which engages the upper end of a hammer lever $v^5$ for sounding the bell $v^6$ when the end of a line limited by the margin stop is reached. The bell hammer is pulled in one direction by a spring $v^{10}$. The movement of the trip lever $v^4$ is limited by a stop $v^7$ projecting from the margin stop V. The lever $v^5$ is pivoted at $v^8$ to an arm extending upwardly from the escapement frame N. The margin stops operate in the usual way to limit movement of the carriage in either direction and in general are of well known construction except that they are constructed for the most part of sheet metal in order to reduce their weight.

The margin stops may be released when desired to permit the carriage to continue its transverse movement in order that additional letters may be printed by means of a margin release key Z pivoted on the rod $q'$ on which the front links G are mounted. This key is of sheet metal, its finger piece $z$ being located just above the upper bank of keys in the key board within easy reach. Its movement in opposite directions is controlled by an arm $z'$ provided with stops $z^{20}$, $z^{21}$ and its inner end $z^2$ which is bent upwardly is connected by a wire, rod or link $z^3$ with the lug $z^4$ projecting forwardly from the arm $z^7$ of the margin release lever Z', which latter has a back stop $z^5$. The upper portion of the lever is pivoted at $z^6$. It will be observed by reference to Fig. 11 that while the margin release lever is located centrally of the machine the link $z^3$ of the margin release key is at the right hand side thereof, the arm $z^7$ of the lever Z' extending a sufficient distance to the right to permit of the connection shown. The lever Z' is pulled in one direction by a spring $z^{12}$.

The operation of the mechanism is similar to that of a Royal standard machine, but the key Z is of novel construction. It will be understood that normally the margin release lever Z' at its upper end is in the path of the stop V, that when a margin stop approaches the margin release lever the bell is rung and immediately thereafter the movement of the carriage is arrested, but that when the key Z is operated the upper end of the margin release lever is moved backwards and thus removed from the path of the margin stop. This operation is similar to that of other Royal machines.

In order to lock the printing keys when the end of a line is reached to prevent the piling up of printed characters, the one upon the other, we employ a line lock lever $Z^{10}$ (Figs. 10 and 11), pivoted at $z^{10}$ to the margin release lever Z'. This lever $Z^{10}$ is pulled in one direction by a spring $z^{11}$, its movement in this direction being limited by an arm $z^{14}$ engaging the lower portion of the margin release lever. The pivotal mounting of the line lock lever is such that normally its upper end is in the path of a margin stop and its lower end removed from an arm $z^{13}$ extending rearwardly from the universal bar shaft $f'$. When the end of a line, determined by the position of a margin stop, is reached the line lock lever is swung on its pivot so as to move its lower end into the path of the arm $z^{13}$ so that the universal bar cannot be operated and hence the key levers and the type bars are held from operation.

It will be observed that the margin release lever and the line lock lever are supported on the tie bar A'.

In order to provide for back spacing, we employ a back space key 1 at the front of the key board and at the right-hand side thereof. The back space lever 2 is pivoted at 3 to the bracket $w$ and has an arm 4 which engages the laterally extending arm 5 of a bell crank lever 6 pivoted at 7 to a bracket 8 extending from the right-hand side of the frame and having an upwardly extending arm connected by a horizontally arranged link 10 with a sliding bar 11 carrying a spring pawl 12 adapted to engage the pinion S of the escapement mechanism. The tail of the pawl abuts against a stop 13. The slide 11 is guided in brackets 14 extending from the escapement frame N. The frame N (Fig. 11ª) is formed with holes $n^{10}$, $n^{11}$ to receive screws 14ª and pins 14ᵇ for attaching the brackets 14 to the frame. These holes are so located as to properly position the brackets while assembling the parts. A spring 15, (Fig. 2) normally pulls the slide 11 away from the pinion. By depressing the key 1, the slide 11 may be operated to actuate the mechanism to set the carriage back one space only. When the key is released, the slide is retracted away from the pinion. By successive depressions of the key 1, the carriage may be set back the desired number of spaces.

In order to prevent back lash from tooth to tooth of the escapement wheel during the operation, we provide a detent ratchet wheel $S^5$ which is engaged by a pawl $s^5$ pivoted at $s^6$ to the escapement frame N and pulled in one direction by a spring $s^7$. The slide 11 has a projection 12ª for preventing the overthrow of the escapement pinion $S^3$ when the slide is actuated.

It will be observed by reference to Fig. 8 that the slide 11 is supported by and guided in the escapement frame and that there is a flexible connection between the slide and the lever 6. By this arrangement the back step devices are raised and lowered with the carriage and are in condition to operate when the carriage is set for both upper and lower case printing.

The ribbon 20 is wound on spools 21 detachably connected with vertical shafts 22, 23 mounted in suitable bearings. The shaft 22 on the left-hand side of the machine is supported in a bracket 24 and the shaft on the opposite side is similarly supported. As shown in Fig. 3 the spools are arranged in a horizontal plane somewhat below the plane of the printing point of the platen in order to economize space and permit of the machine being of reduced height. The ribbon is led from each spool diagonally rearwards and outwards toward the adjacent side of the machine and around a roller-carrying guide post 25 or 26. Each of these posts is located in a vertical plane between the platen and the spool with which it co-operates. In this way a relatively straight and extended portion of the ribbon is delivered to the ribbon guide or vibrator 60. In order to prevent the ribbon from moving upwards on the posts said posts are formed with heads 25ª, 26ª. which are tapered or coned on their under sides.

The lower end of the vertical shaft 23 on the right hand side of the machine is geared to a horizontal shaft 27 mounted in the lower ends of arms 24', which form parts of the brackets 24. The ribbon spool shaft 22 on the left hand side carries a spur gear 28 (Fig. 9) which is adapted to engage a worm 29 on the inclined worm shaft 30, which is also adapted to engage a spur wheel 31 on the shaft 27. When the worm 29 engages the toothed wheel 28, the ribbon spool on the left-hand side is positively actuated and when the worm engages the wheel 31, the ribbon spool on the opposite side is actuated positively. The shaft 27 is permanently geared to the shaft 23 of the right-hand ribbon spool, as shown at 23ª, Fig. 22. The manner in which the actuating worm operates upon the pinions 28 and 31 has been hereinbefore explained. The worm shaft 30 on the front end of which the worm 29 is secured, extends downwardly and rearwardly as shown in Fig. 9 and is connected by a universal joint 33 with another shaft 34 extending through a sleeve 35 secured to the bracket $q^4$ which supports the spring drum as before explained. The shaft 34 carries a pinion 36 which meshes at all times with a toothed disk 37 on the drum Q which thus rotates the shaft 34 and the worm shaft when the drum is actuated to advance the carriage. The revolution of the worm shaft is controlled by detent devices 38 of well known construction.

Near its front end the worm shaft 30 carries a ratchet wheel 39 engaged by a pawl 40 carried by the downwardly extending arm 41 of a bell crank lever. This lever is pivoted at 43 to the left-hand extension of the segment (Fig. 2) and has a horizontally extending arm 44 which engages a ribbon shifter 45 secured to a horizontal shaft 46 mounted to turn in ears 47 forming parts of the bracket 24 on the left-hand side of the machine. The shaft 46 extends through the front of the machine and is provided with a handle 48 by means of which the shaft may be operated. The ribbon shifting device 45 is provided with three edge portions 49, 50, 51 which are adapted to engage the under side of the arm 44 of the lever 41 for the purpose of causing either one of the ribbon spools to be actuated or to throw them both out of gear with the driving mechanism. The lever 41 is held against the shifting device 45 by a spring 52 and the worm is thus held in engagement with either the toothed wheel 28 or the wheel 31. In this way either ribbon spool may be actuated to wind the ribbon, while the other ribbon spool runs free. It will be observed that the worm and its shaft instead of being shifted vertically as heretofore are moved laterally or horizontally from one wheel 31 to the other 28, and vice versa. In this way space is economized and room provided for other mechanism. By thus arranging the shafts and the mechanism with which they are associated, they are adapted to the oblique arrangement of other parts of the mechanism and to the general small size of the machine.

The ribbon is conveyed from the spools 21 and the guides 25, 26 to the ribbon guide 60, which is operated to reciprocate the vibrator vertically in order that the wear on the ribbon may be distributed. This ribbon guide or vibrator, as it is generally called, is preferably of the kind shown in Figs. 22-26 inclusive, and it is supported by the type bar guide $B^2$, which latter is secured to the segment B. This type bar guide, it will be observed, has a base portion $b^{10}$ attached to the segment and a front portion $b^{11}$ which extends from the base forwardly and then upwardly in front of the platen and at the top is formed with a bifurcated type guide portion $b^{20}$.

The vibrator 60 has an upper guide part and a downwardly extending leg 61 which is bent and extends rearwardly and then downwardly as shown in Fig. 6 where it is connected with a bell crank lever 70 pivoted at 71 to the escapement frame N and having a downwardly extending arm 72 pivotally connected at 73 with a downwardly and rearwardly extending arm 74, having a rear edge provided with two parts 75, 76 adapted to engage a pin 77 carried by the lever $T^2$ which as before explained is actuated by the universal bar. Each time that the universal bar is actuated the arm 74 is turned on its pivot 73 and correspondingly moves the bell crank lever 70 which in turn actuates the vibrator. The lever 70 is pulled in one direction by a spring $70^a$.

When a bichrome ribbon is used, it is necessary to shift the vibrator so that it may present only one color to the type while vibrating. For this purpose we provide a lever 80 at the front of the machine which is pivotally mounted at 81 and connected by a link 82 with an arm 83 on a shaft 84 carrying a notched hub 85 engaged by a pawl 86 pivoted at 87 to an extension of the escapement frame and held in engagement with the hub by a spring 88. The hub has two notches 89 and 90 with either of which the pawl 86 is adapted to engage, and the pawl may be made to engage in either of these notches by turning the lever 80 in the proper direction. The shaft 84 has an arm 91 to which is pivotally connected a link 92 pivotally connected at 93 with an arm 94 of the lever 74. By these devices when the lever is shifted either of the edges 75 or 76 may be presented to the pin 77 in such manner as to elevate or depress the vibrator and cause it to operate in front of either the top or bottom portion of the ribbon which as usual has one color at its upper portion and a different color at its lower portion.

The downward movement of the lever 70 is limited by a stop 79 and this lever is urged towards its stop by the spring $70^a$ as shown in Fig. 6.

The preferred form of vibrator is shown in Figs. 22-26 inclusive. The downwardly extending leg 61 of this vibrator is bifurcated at its lower end where it joins the lever 70 and it is formed with lips 62 which engage the type bar guide in such manner that the vibrator is properly held and guided as it reciprocates or vibrates. The upper part of the vibrator is obliquely arranged correspondingly with the oblique arrangement of the carriage, and it is bifurcated as indicated at 63 (Fig. 26) to receive the type and allow them to act on the ribbon. On opposite sides of its bifurcation, ribbon guiding openings or slots 64, 65 are formed the inner parts 66 of the guide being straight and flat. The upper parts or fingers 67 and 68 are parallel and in the same plane with the parts 66, but the lower parts or fingers 69, 69' are in vertical planes outside the planes of the fingers 67 and 68 and are inclined forwardly and upwardly (Fig. 24) and their extreme upper ends are turned backward and are rounded. There are spaces $69^2$ between the fingers for the insertion of the ribbon and the fingers 69 and 69' are in a vertical plane outside or in front of the vertical plane of the fingers 67 and 68 and laterally to one side thereof. The effect of this construction is illustrated in Figs. 22-25 inclusive. The ribbon as it comes from the guide post 25, for instance, passes across the upper curved end of the finger 69, then through the opening 64, across the inner wall of this opening, and in contact with the rear sides of the middle portions 66 of the guide and then across the edge of the inner wall of the opening 65, next through said opening and around and in front of the upper curved edge of the finger 69'. As will be observed by reference to Fig. 24, the ribbon 20 rises as it leaves the guide post 25 and as it approaches the vibrator. Without some special provision in the vibrator for preventing it, the ribbon would twist, curl, lap or otherwise become distorted, but by the special construction above described, this twisting or distorting of the ribbon is prevented. The finger 69 makes contact with that portion of the ribbon where it tends to twist and holds it in a flat condition as it enters the vibrator. The behavior of the ribbon and its guides is the same on opposite sides of the device whichever way the ribbon is moving. Unless the lower, front fingers be extended forwardly as shown, the ribbon when changing from an upwardly inclined direction to a straight transverse direction would bend near the vibrator and turn the lower part of the ribbon rearward. The fingers 69, 69' prevent the lower portion of the ribbon from being thus turned backward or corrects this tendency and causes it to be directed through the vibrator in a straight, even path. As the ribbon passes through the vibrator it makes contact with the outer walls of the openings 64, 65 which are in advance of or in a plane in front of the inner walls of these openings, and thus the tendency of the ribbon to twist or curl is corrected. The high points at the upper ends of the fingers 69, 69' over which the ribbon passes serve to keep the ribbon taut as well as flat against the flat back face of the vibrator, thus insuring a clear printing impression of the type and preventing interference with some of the working parts which might occur if the ribbon were permitted to buckle behind the vibrator.

It will be observed that the inner edges of the lower fingers 69, 69' are further distant from the inner walls of the openings 64, 65 than the inner edges of the upper fingers, the fingers 69, 69' being in different vertical planes. This also contributes to the proper guiding of the ribbon.

It is not essential that the lower fingers should be in vertical planes to the side of the upper fingers as the device also operates efficiently when the lower fingers are in the same vertical planes transverse to the axis of the platen, but the upper or outer ends of the lower fingers should be disposed in front of the upper fingers.

Figures 27 to 31 show another form of vibrator. In this case both the upper and lower guide fingers are in the same plane with each other but are all set at an angle to the oblique plane of the body of the vibrator. In this case the ribbon from the guide post 25 passes over or in front of the upper and lower guide fingers 670 and 690, then through the openings 640 behind the middle parts 660, then through the opening 650 and then in front of the fingers 680, 691. This construction also serves in a measure to properly change the direction of the ribbon from an upwardly inclined to a straight across path and to correct the tendency to twist or buckle, but the construction shown in Figs. 22-26 is preferred, as experience has demonstrated that such latter construction operates more efficiently. The fingers are held in the forwardly inclined position shown by the webs 610. Fig. 31 shows the blank from which the vibrator is formed.

The vibrators shown in the drawings are so constructed as to properly guide the ribbon and prevent it from twisting or buckling when operating on either the upper or lower portion thereof. The ribbon is made to pass through the vibrator smoothly and evenly and to be properly wound on the ribbon spools.

The paper on which the printing is done is fed over a table 100 carried by arms 101 pivotally connected with the ends of the margin stop rail and held in its forward position by a spring 102 surrounding the right-hand end of said rail and engaging one of the arms 101 as shown. In this way the table is held in its forward or operative position until moved positively rearwards. When moved rearwards it must be held by the hand of the operator. When released it automatically moves forward to normal position. The table is operated by hand in the usual way, and is held forward to using position as indicated in Fig. 3, or thrown back to expose the margin stops, etc., as shown in Fig. 6. It co-operates with another table 103 extending from the lower edge of the table 100 under the platen and upwards across the lower portion of the front of the platen.

The table 103 forms part of a cradle movable upwards and downwards toward and from the platen. Front and rear pressure rolls 104, 105 are carried by yokes 106 carried by a rod 107 supported by the front ends of arms 108 carried by a shaft 109 mounted in bearings rising from rail $l$ of the carriage. This shaft 109 carries an arm 110 pulled by a spring 111 in such manner as to normally hold the pressure rolls in engagement with the platen or against the paper surrounding the platen. A pin 112 on the lower front end of the arm 110 is engaged by the recessed end of the paper release lever 113 pivoted at 114 to the carriage frame. By operating this lever the paper feed rolls may be moved towards or from the platen.

The paper is also held in printing position on the upper portion of the platen by pressure rolls 115 carried by a scaled rod 116 and adjustable endwise thereon. The rod is carried by arms 117 attached to a transverse rod 118 pivoted to the sides L of the platen carriage. A spring 119 attached to the arm 117 on the right-hand side of the machine and to the side frame L of the carriage serves to hold the rollers in engagement with the platen or in a swung back or retracted position. These pressure devices are usually called the bail. The bail shown, it will be observed, comprises front and rear transverse rods and a pair of side arms, the rear rods serving as a pivot for the bail.

In order to hold the rollers 115 a slight distance above the platen without throwing the bail back so that it may still guide the paper without pressing it against the platen, we employ a lever 120 pivoted at 121 to the arm 117 of the bail on the right-hand side of the machine and having a lug 122 adapted to engage a cam edge 123 on the right-hand side plate L. The rearward extension of the lever is provided with a finger piece 124 by means of which it may be operated. When the lever is in the position shown in Fig. 4, the rollers 115 are allowed to engage the platen or the paper thereon, but when the finger piece 124 is lifted, the lever engages the cam edge 123 which raises the rollers to a limited extent. It will be understood that when wide paper is used, the rollers 115 are generally employed, and when narrow paper, cards, or envelopes are being printed upon, the rollers 115 serve a useful purpose in holding them in printing position. The lever 120 is provided with a lug 122$^a$ which strikes against the edge of the adjacent arm 117 and thus limits the movement of the lever when said lever is moved forward to raise the bail from the platen.

The table 100 is formed on one side with a depression 100$^a$ in which is mounted a scale plate 100$^b$ in order to form a guide for the margin of the paper. The scale plate is provided with proper graduations and also carries studs 100$^c$, extending through slots in the table and carrying adjusting nuts 100$^d$. In this way the scale is located below the plane of the table and forms no obstruction to the paper and means is also provided for giving it delicate adjustments to conform to other scales on the machine. It has heretofore been proposed to provide a margin scale on the paper table, but the custom heretofore has been to print the scale on the table by a transfer process. It has been found that such a scale becomes blurred, scratched or otherwise marred and is not sufficiently accurate. We have overcome this difficulty by the improvements above described.

In front strike visible typewriting machines where the carriage structure and its tracks or guide rails and the margin stops are located behind the line of print and behind the paper table, the stops are not so readily accessible for frequent adjustment as they are in some machines where the stops are located in front of the line of print, although such machines have objectionable features not present in machines where the margin stops and their rail are removed from the front of the machine, so as to leave a clear space in front of the line of print. We now provide means whereby the margin may be quickly adjusted by devices in plain view and within easy reach of the operator in a machine in which the usual margin stops and their supporting bar or rail are mounted in rear of the platen and the paper table, so that all of the advantages of a machine of this type are preserved, while the facility with which the margin of the paper may be adjusted is greatly enhanced, making it possible to adjust the margin in this type of machines as easily as in machines where the margin stops are arranged in the front part of the machine.

In setting the margin stops it is customary to place the left-hand stop at the zero position on the margin scale so that upon each return of the carriage it rests at that point. According to our invention the stop is placed at a predetermined position on the indicating scale other than the normal zero position. This position normally brings the carriage, on its return, to a predetermined position, which leaves a margin at the left-hand side of the paper equal to the distance between the margin stop position and the left-hand edge of the paper. In order to adjust the margin within these limits, when it is desired to vary the margin as the printing progresses, we effect the control by an adjustable paper gauge on the paper table, the position of which may be easily changed and which co-operates with a scale carried by the table.

Fig. 1$^a$ of the drawings shows a portion of the paper table 100 carrying the adjustable scale 100$^b$, before described. The margin rail in rear of the table is indicated at V' and an adjustable margin stop at V. In this case the table is provided with a tubular extension 300 which serves as a bearing or support for a rod 301, which is adjustable endwise in the bearing. The rod carries a paper guide 302 which overlies the left-hand portion of the table below or in front of the scale 100$^b$. The guide 302 may be adjusted transversely over the table along the scale 100$^b$, and held in the desired or selected position.

Assuming that the margin stop is in a predetermined position, say 15 on the scale, and the paper gauge is at its extreme left-hand limit on the table, a desired margin may be obtained by moving the guide to the right on the table so that it will coincide, for instance, with the figure 5 on the scale 100$^b$. The margin is then reduced five spaces and if the guide be moved to 10 or some other position on the scale the margin becomes correspondingly reduced. It will therefore be seen that by means of the margin stop, (located at a predetermined position), paper table, scale, and paper guide carried by the table, the marginal control of the printing point is effected by the adjustment of the paper relatively to the paper guide in contradistinction to the usual practice of inserting the paper and allowing the margin stop in its normal zero position to control the location of the paper. It will also be observed that our invention contemplates the adjustment of a paper guide on the table rather than adjustments of the margin stop for variable margins.

The platen is made as light as possible. It preferably comprises a hollow wooden core $k^2$ covered by rubber $k^3$. At one end it carries a gudgeon $k^4$, to which one of the platen knobs 200 is connected. The gudgeon is formed with tongues $k^5$ by cutting the metal in the manner shown and turning the tongues laterally at right angles to the body of the disk $k^6$ forming part of the gudgeon. These tongues are so located as to exactly fit the bore at one end of the platen and thus to centralize the gudgeon therein. After being thus applied the gudgeon is secured in place by fastening devices $k^7$. These features of the invention are shown in Figs. $7^b$, $7^c$, $7^d$ and $7^e$.

At the opposite end of the platen the ratchet wheel 139 is attached in a somewhat similar way. Said wheel 139 is secured at $k^8$ to a disk $k^9$, provided with tongues $k^{10}$, which exactly fit the bore of the platen. The ratchet wheel and disk are formed with screw holes $k^{12}$ through which extend fastening devices which firmly secure the ratchet wheel and the disk to the platen in true alignment with the gudgeon at the opposite end of the platen. By these devices we are enabled to so apply the platen operating mechanism that the latter may be revolved with the greatest accuracy about its axis.

The platen is turned for line spacing by a lever 130 pivoted at 131 to a bracket 134 on the left-hand side plate L of the carriage. The lever projects forwards to a considerable extent from the platen, its end 132 being within easy reach of the operator. The lever serves not only to operate the line spacing device, but also to return the carriage to starting position. Said lever swings about a substantially vertical axis limited by a downwardly extending arm 133 engaging the rear edge of the bracket 134 on which the lever is pivoted. An arm 135 of the lever engages an upwardly extending arm 136 mounted to turn on a sleeve 137 secured in the side plate L. The lever is pulled in one direction by a spring $135^a$. This arm carries a pawl 138 adapted to engage a ratchet wheel 139 securely fastened to the left-hand end of the platen. The pawl is drawn towards the ratchet wheel by a coiled spring 140 and the upward movement of the pawl is limited by a stop 141 carried by the upper end of the arm 136. When the lever 130 is moved from left to right, it swings the arm 136 rearwardly, causing the pawl to engage a tooth of the ratchet and thus turn the platen the desired distance. Afterwards the carriage is moved to starting position. The rearward movement of the pawl 138 is limited by an adjustable eccentric stop $138^a$ secured to the left-hand side plate L. Overthrow of the platen is prevented by a detent 142 which engages the ratchet wheel on its under side. This detent is pivoted at 143 to the side plate L and it has an L shaped arm 144 to which is connected a coiled spring 145, which normally holds the detent in engagement with the ratchet wheel with a yielding pressure. In this way, overthrow of the platen while being turned for line spacing is avoided and the platen is also normally held against movement except when positively actuated. When desired the detent may be withdrawn from the ratchet for fractional spacing by a lever 146 having a finger piece 147 within convenient reach of the operator and which is pivoted at 148 to the frame in rear of which pivot it has an extension 149 adapted to engage a pin 150 projecting laterally from the lower end of the detent lever. When the finger piece is pushed in, the extension 149 engages the pin 150 and the detent is withdrawn.

Means is provided whereby the platen may be turned for either single space or double space line printing. For this purpose we employ a lever 160 extending rearwardly from a shouldered nut 161 on the sleeve 137 and carrying an arm 162 having a forwardly extending curved piece 163 adapted to engage a pin 164 extending laterally from the pawl 138. By turning this lever, the toothed end of the pawl may be raised or lowered in such manner as to engage the next tooth on the ratchet wheel or to pass over a tooth and engage the second tooth, or the desired tooth, i. e., the pawl may be operated to effect single space or double space printing. The lever 160 may be set in either position desired and held by a bur 165 on its side which is adapted to engage an indentation 166 in the side plate L of the carriage or a similar indentation formed on the side plate beneath the bur shown in Fig. 5.

Fig. 2 shows a scale for cards, envelopes, etc. The part 170 is formed with outwardly turned curved ends $170^a$, and it has a central opening $170^b$. It is also formed at its ends with projections $170^c$, which are adapted to bear against the card, envelope or paper being printed. Similar projections $170^d$ are formed on the plate on opposite sides of and near the central opening $170^b$ and there are also projections $170^e$ interposed between the projections $170^d$ and $170^c$. In this way the card or envelope operated upon is very securely held in place and is especially useful when the bottom portion of the envelope is being printed. These devices also cooperate very nicely with the paper rollers 115 located above them. The scale plate 170 is attached by means of screws 201 to arms 202 which are connected by a cross-piece 203 as shown by dotted lines in Fig. 2, and these arms 202 are extended downwardly, rearwardly and then downwardly again as indicated in Fig. 6 and are attached as indicated at 171 to the front portion of the frame $N^{10}$ below the shift rail. The cross connection 203 is provided with a pointer 181 cooperating with the scale 180. This new scale 170, it will therefore be observed, contains several novel features and the construction is such as to enable the scale to be properly associated with the type bar guide $B^2$ and the ribbon vibrator 60. The arms 202 are prolonged to a considerable extent above the upper edge of the plate 170, providing fingers 205 similar to those shown in prior patents on the Royal Standard machine and serving a similar purpose. Holes 172 are made in the segment B to receive the screws which attach the bracket to the frame (Fig. 6).

A front scale 180 is shown in the drawings. This is of ordinary construction and is used in well known ways. The platen may be turned when desired by the knobs 200 in the usual way.

The machine thus described realizes the objects of our present invention. The mechanism shown in the drawings and hereinbefor described has been thoroughly tested and operates most efficiently. The machine is of small dimensions, compact, of light weight and portable. It has many advantages over portable machines of other kinds, having many features of the Royal Standard typewriting machine not found in other machines in use and it has the advantage of employing a full number of keys in the keyboard operating in connection with the platen which has only a single shift for any or all of the characters printed by the machine. The results obtained are largely due to the fact that the mechanism in the rear part of the machine is obliquely arranged in such manner that the line of print is clearly visible, this line of print being above a horizontal line drawn through the axis of the platen. In order to attain this result it was necessary to mount the platen in such manner that its carriage might be shifted obliquely and this involves many reorganizations of the mechanisms of the Royal Standard machine and the introduction of the many new and different parts all of which have been hereinbefore described and these novel features are pointed out in the accompanying claims.

Features shown and described but not claimed in this application are claimed in a series of divisional applications Nos. 473,161 to 473,173 inclusive, all filed May 27, 1921.

We claim as our invention:—

1. A typewriting machine comprising a sheet metal frame, an assembly unit supporting the key levers and type bar connections in substantially horizontal position and attached to said frame, a cast type bar segment attached to the frame in an inclined position, and a sheet metal frame attached to the main frame and supporting the carriage, escapement mechanism and other instrumentalities in an inclined position.

2. A typewriting machine comprising a sheet metal frame, an assembly unit supporting the key levers and type bar connections in substantially horizontal position, said unit being formed of sheet metal and attached to the main frame, and a sheet metal frame movably attached to the main frame and supporting the carriage, escapement mechanism and other instrumentalities in an inclined position.

3. A typewriting machine comprising a main frame, a type segment and a carriage supporting frame carried by the main frame and in inclined parallel arrangement, type bars supported in the segment and extending forwardly, ribbon spool shafts supported in the main frame, a spring drum on the carriage supporting frame, and ribbon driving connections extending forwardly from the spring drum to a point in advance of the type segment.

4. A typewriting machine comprising a main frame, a type segment and a carriage supporting frame carried by the main frame and in parallel inclined arrangement, type bars supported in the segment and extending forwardly, ribbon spool shafts supported in the main frame, a spring drum on the carriage supporting frame, ribbon driving connections extending forwardly from the spring drum to a point in advance of the type segment, and a substantially horizontal universal bar frame underlying said driving connections.

5. A typewriting machine comprising a main frame, vertical ribbon spool shafts mounted therein, a horizontal driving shaft therefor extending transversely of the machine and having gears at its ends, a longitudinal driving shaft extending rearwardly from the transverse shaft, a transverse pivot shaft slightly in the rear of the transverse ribbon shaft, horizontal key levers pivoted thereon but bent downwardly on each side of the pivot shaft, and a generally horizontal universal bar frame located beneath the longitudinal driving shaft and engaged by the rearward downward extensions of the key levers.

6. A typewriting machine comprising a main frame, an inclined type bar segment attached to the main frame and having an abutment upon which the type bars strike, an auxiliary frame attached to the main frame and carrying the carriage, escapement mechanism and other instrumentalities, said auxiliary frame and the parts carried thereby being inclined to the vertical, and means for adjusting the inclination of the auxiliary frame to vary the printing point slightly with reference to the abutment on the segment.

7. A typewriting machine comprising a main frame, an inclined type bar segment mounted therein and having an abutment against which the type bars strike in their printing movement, a carriage supporting frame mounted in an inclined position, and means for adjusting the inclination of the carriage supporting frame to vary the printing point with reference to the abutment on the segment.

In testimony whereof, we have hereunto subscribed our names.

EDWARD BERNARD HESS.
LEWIS CAREY MYERS.